Figure 1:
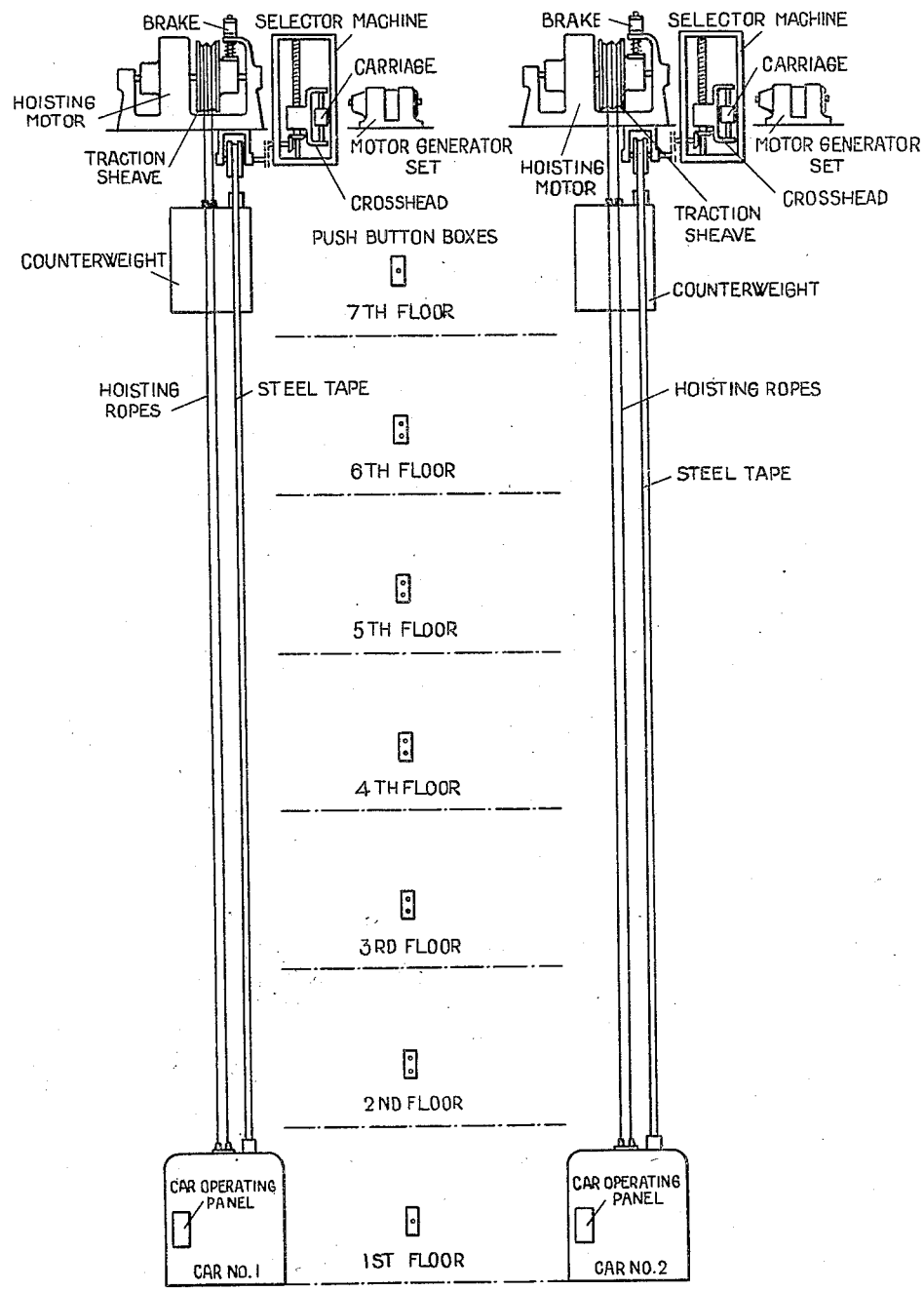

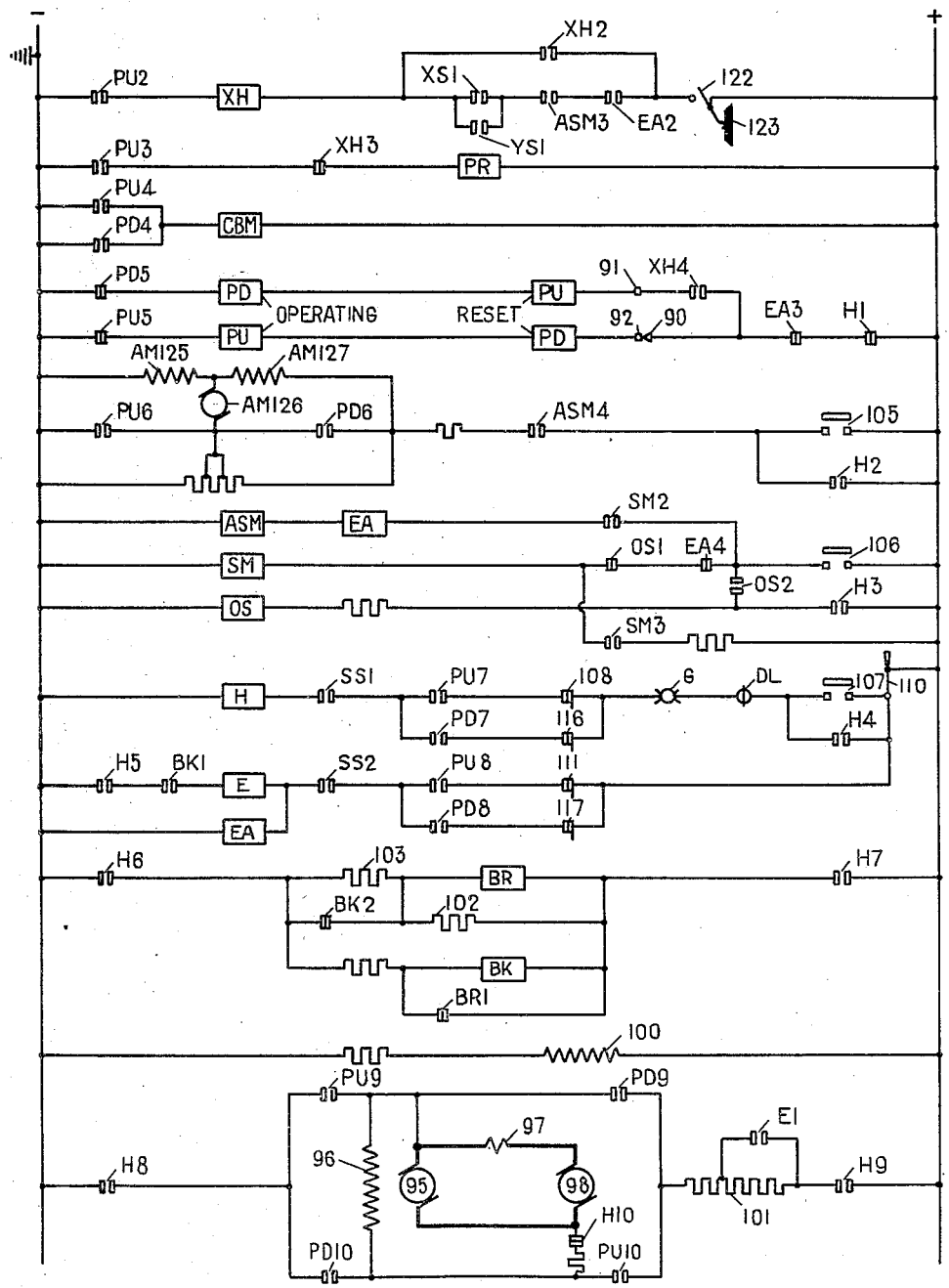

Oct. 26, 1948.  G. WATSON ET AL  2,452,342
ELEVATOR CONTROL SYSTEM
Filed June 24, 1944  8 Sheets-Sheet 6

Gavin Watson
William Henry Bruns
Harold Edward Galantey  } INVENTORS
BY Matthew D. Bradley  ATTORNEY Patented Oct. 26, 1948

2,452,342

UNITED STATES PATENT OFFICE 2,452,342

ELEVATOR CONTROL SYSTEM

Gavin Watson, Ossining, and William Henry Bruns, Lincolndale, N. Y., and Harold Edward Galanty, Hillside, N. J., assignors to Otis Elevator Company, New York, N. Y., a corporation of New Jersey Application June 24, 1944, Serial No. 541,970

42 Claims. (Cl. 187—29)

The invention relates to elevator systems.

The object of the invention is to cause operation of the elevators so as to obviate undue waiting by intending passengers for response to calls.

The invention is useful in elevator control systems in which the starting of the elevator car after each stop is under the control of an attendant in the car, while the stopping of the car is automatic, stops to discharge passengers being made in response to push buttons within the elevator car operated by the attendant as directed by the passengers, and stops to take on passengers being made in response to push buttons at the landings operated by the intending passengers themselves. At intermediate landings, two push buttons are provided, one an up button for operation by intending passengers desiring to be carried in the up direction and the other a down button for operation by intending passengers desiring to be carried in the down direction. With such control applied to a plurality of elevator cars, push buttons at the landings are common to the cars.

In such installations, it often happens during busy periods that cars which are filled to capacity are non-stopped past floors for which calls have been registered from the floors with the result that the intending passengers who registered such calls have lengthy waits before getting service. This is especially true during peak demand periods of the day which occur in the morning when the building is being filled, the evening when it is being depopulated and at noon when there is heavy traffic both outgoing and incoming. During the evening peak for example, intending passengers at intermediate and lower floors who have registered down calls may have to wait for considerable periods for response owing to the cars being filled to capacity at floors above, necessitating non-stop operation.

The invention involves giving preference with respect to hall calls to those which have been registered for more than a certain length of time. The invention will be described as applied to an elevator system in such way as to give preference to down calls which have been registered for such time periods.

In carrying out the invention for such application, upon the expiration of a predetermined time interval after the registration of an unanswered down call, this call becomes effective to stop an up travelling car and set it for travel in the down direction. However, it is preferred to stop a car which has no push button within the car pressed for a higher floor and such car will hereinafter be referred to as an available car.

Various installations have different traffic problems and it may be considered desirable when more than one of such timed calls exist, to give preference to the lowest, the highest or the longest of such calls, depending upon the requirements of the particular installation. In the case of the lowest of such calls, the first available car set for upward travel to reach a floor for which a down call has been registered for more than a certain length of time is caused to stop at that floor even though down calls which also have been registered for more than such time exist for floors above. In the case of the highest of such calls, where two or more down calls have been registered for more than a certain period of time, the first available car set for upward travel to reach the highest of the floors for which such calls then exist is caused to stop at that floor and the other of such calls are not responded to as timed calls until after such highest call has been picked up. In the case of the longest of such calls, where two or more down calls have been registered for more than a certain length of time, only the longest of these is effective as a timed call, and upon that call being responded to the next longest becomes effective as a timed call.

Any of these timed calls may be answered by cars in the regular course of operation. In each case in which a car stops at a floor in response to a timed call, it is set for travel in the down direction. Thus upon being started, it travels in the down direction stopping to pick up down calls for floors below until filled to capacity. In the embodiments of the invention illustrated, the system may be changed over to provide any of these operations.

Features and advantages of the invention will become apparent from the following description and appended claims.

Figure 2A:
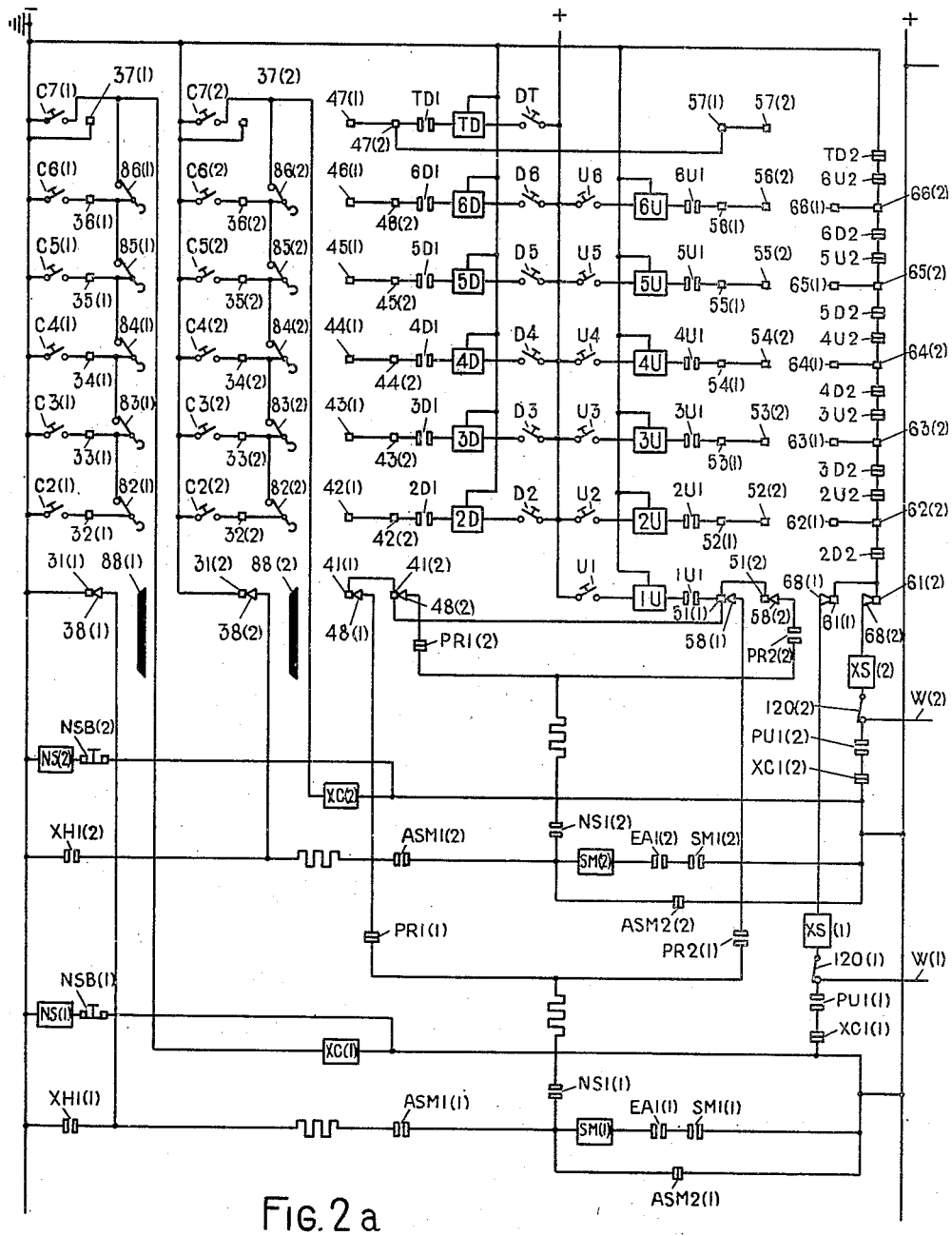
Figure 2B:
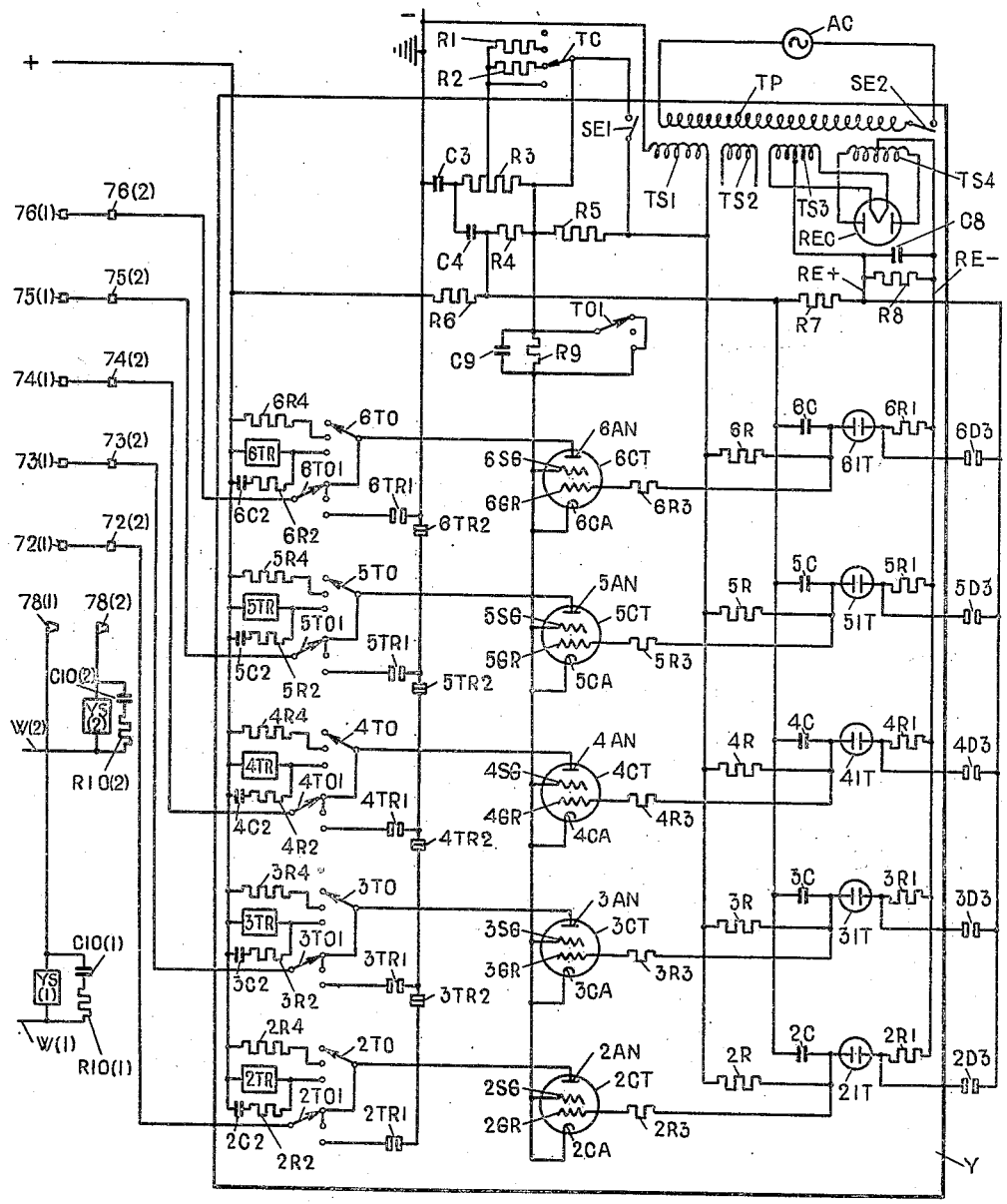
Figure 2S:
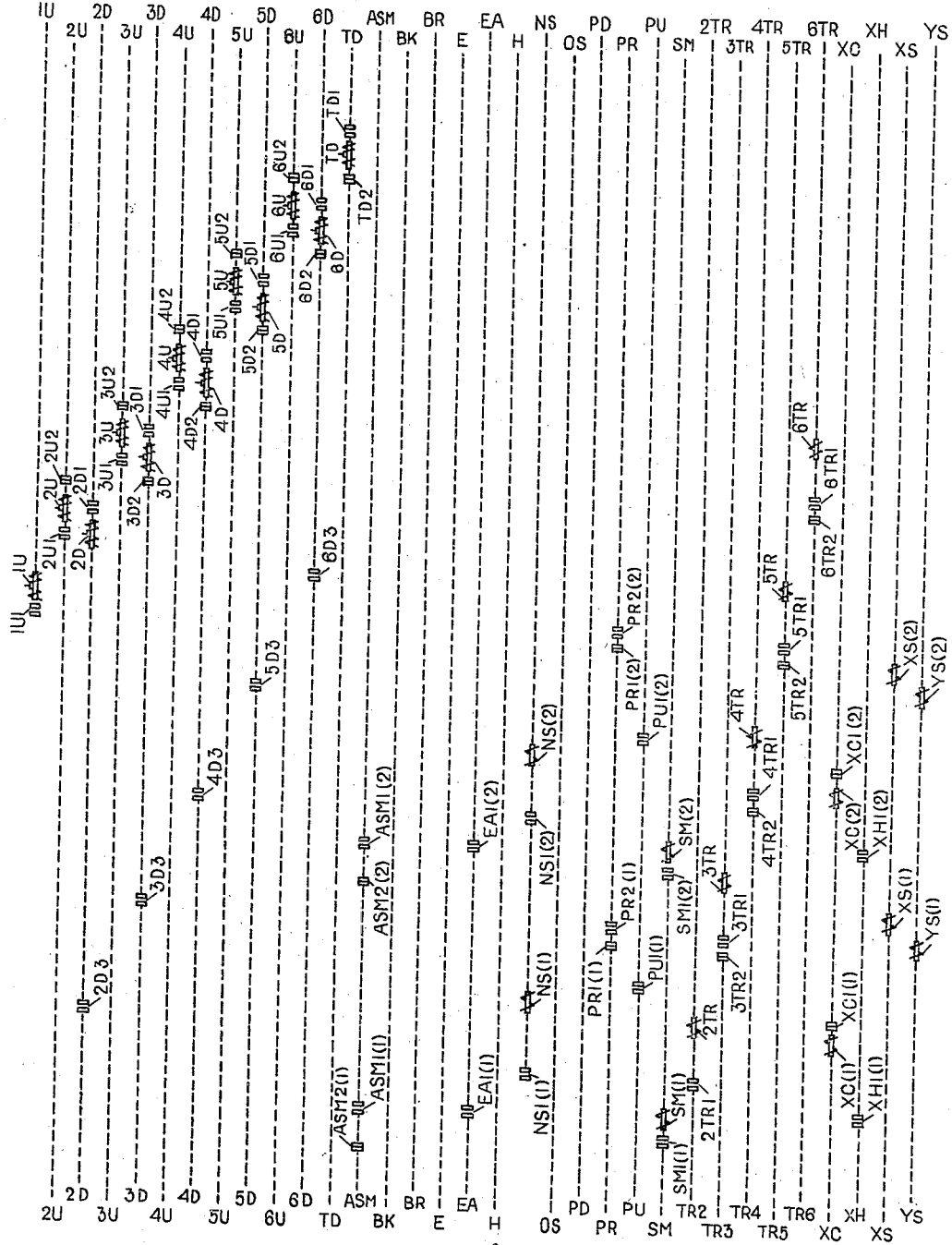
Figure 3S:
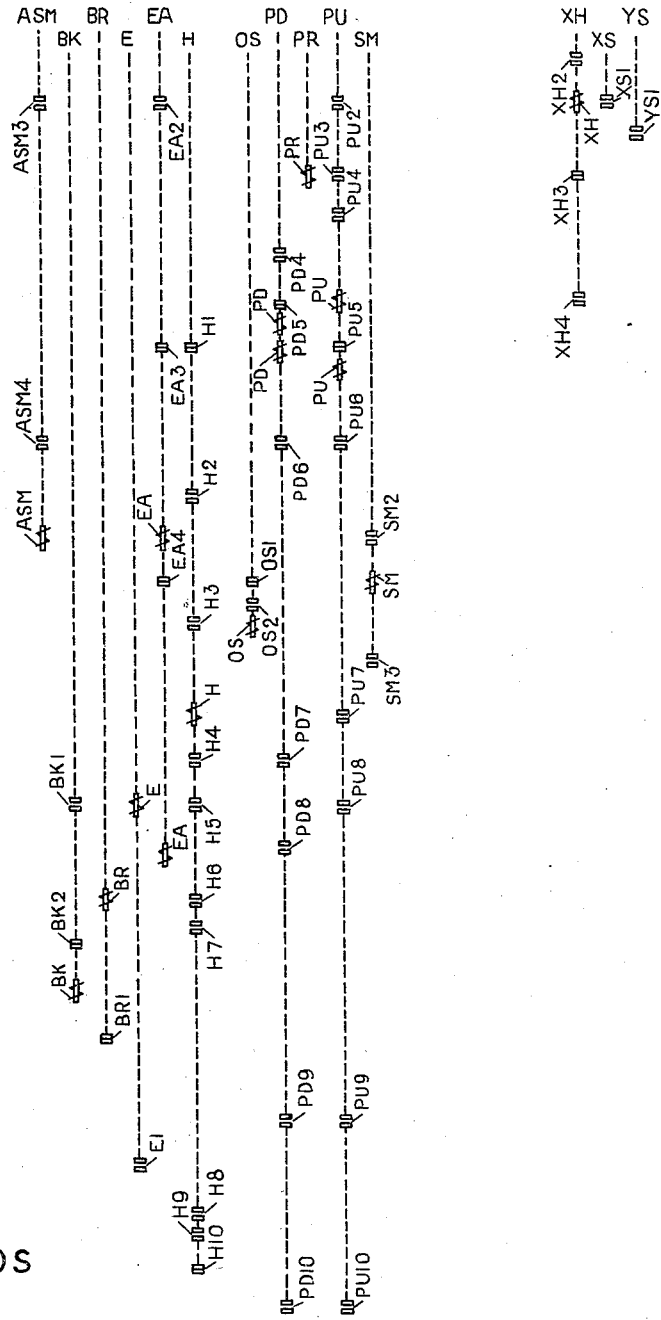
Figure 4:
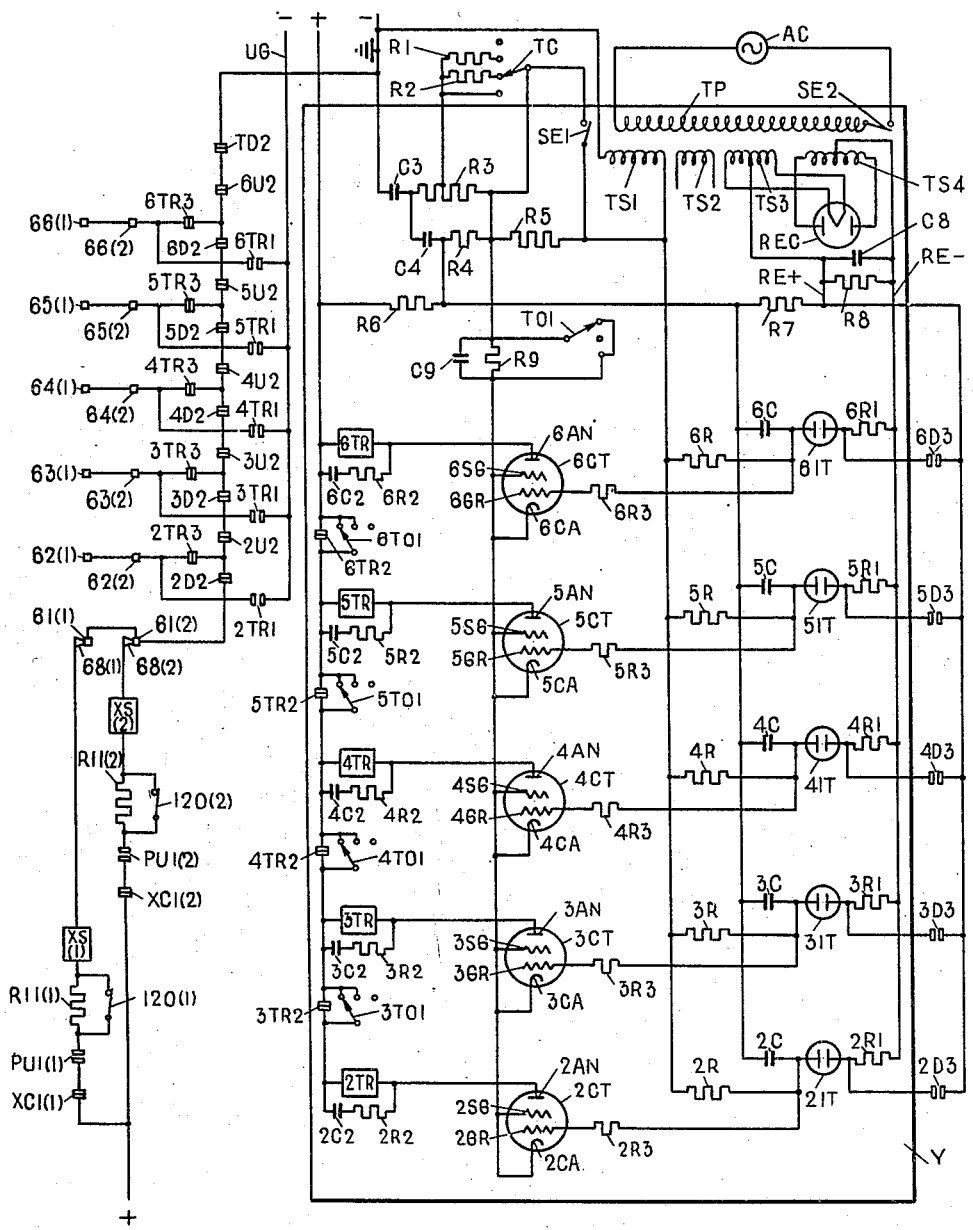
Figure 4S:
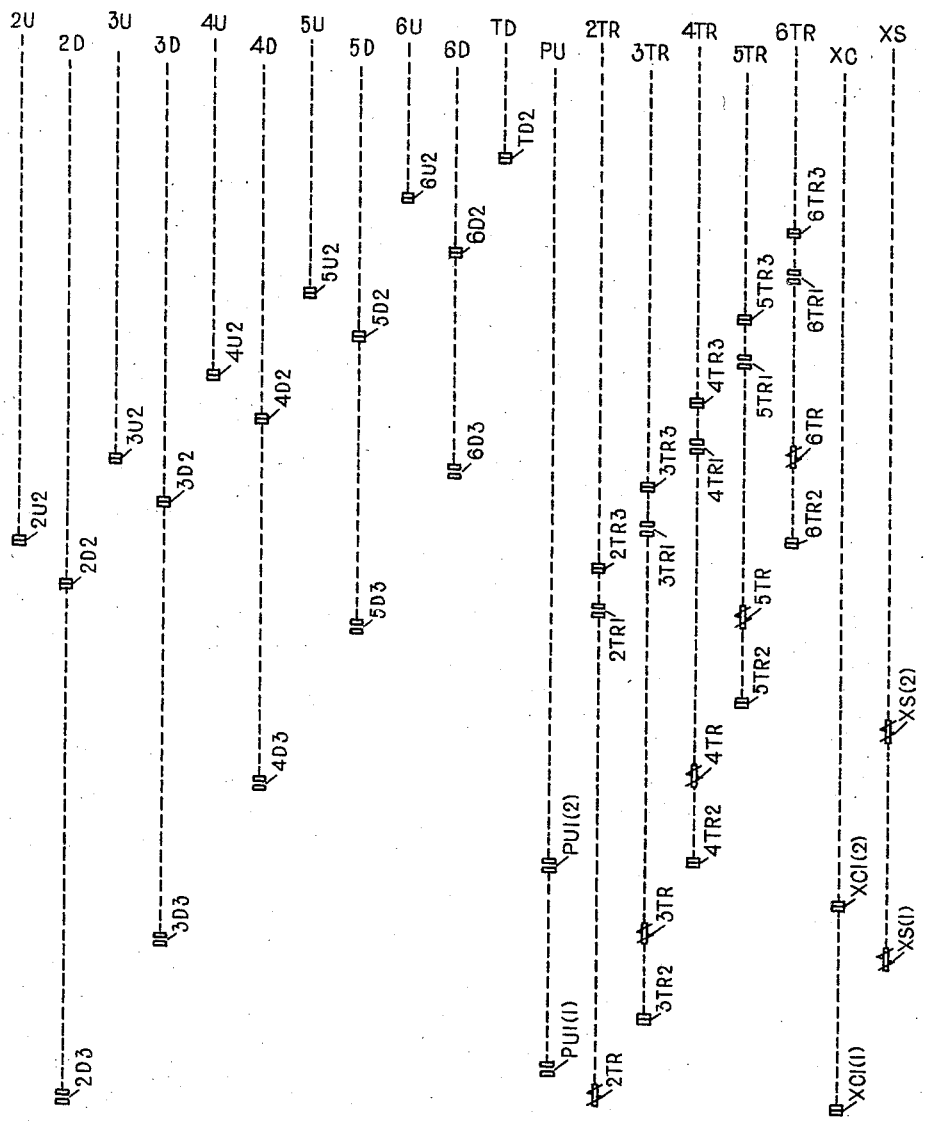

In the drawings:

Figure 1 is a simplified schematic representation of an elevator installation in accordance with the invention;

Figures 2a and 2b, taken together, constitute a simplified wiring diagram of the push button control circuits, the call pick up and call restoring circuits and the timing circuits for a plurality of elevators in accordance with the invention;

Figure 3 is a simplified wiring diagram of the power and control circuits for one of these elevators;

Figure 4 is a simplified wiring diagram of another arrangement of circuits for controlling the operation of the elevator cars in response to the timing apparatus; and Figures 2s, 3s and 4s are key sheets for Figures 2a and 2b, Figure 3 and Figure 4 respectively, showing the electromagnetic switches in spindle form with the contacts and coils on the spindles in horizontal alignment with the corresponding contacts and coils on the wiring diagrams.

For a general understanding of the invention, reference may be had to Figure 1, wherein various parts of the system chosen to illustrate the principles of the invention are indicated by legend. Two elevators are illustrated, the arrangement being the same for each elevator. Each car is raised and lowered by means of a hoisting motor, which motor drives a traction sheave over which pass hoisting ropes for the car and counterweight. An electromechanical brake is provided and is applied to effect the final stopping operation and to hold the car when at rest.

Each elevator car is provided with a car operating panel on which are located a plurality of control switches for operation by the car attendant. These switches include a start control switch, a plurality of push buttons, one for each floor above the lower terminal, hereinafter termed car buttons, a safety switch and a non-stop button. These switches are shown in the wiring diagrams of Figures 2a and 3.

At each floor is a push button box within which are arranged push buttons, an up and a down push button at each intermediate floor and one push button at each terminal floor. These push buttons, which will hereinafter be termed hall buttons, are common to the cars.

In Figures 2a, 2b and 4 the circuits are shown for two elevators, as indicative of such circuits for any number of elevators controlled as a group. The circuits in all these figures are indicated for a seven floor installation. Figure 3 shows the starting and stopping circuits and power circuits for one elevator, it being understood that such circuits are provided also for the other elevators.

The circuits of Figures 2a, 2b, 3 and 4 are shown in "straight" or "across-the-line" form, in which the coils and contacts of the various switches are separated in such manner as to render the circuits as simple and direct as possible. The relationship of these coils and contacts may be seen from Figures 2s, 3s and 4s, where the switches are arranged in alphabetical order and shown in spindle form. The positions of these coils and contacts in the wiring diagram may be found by referring to Figures 2s, 3s and 4s, where the coils and contacts are positioned on the spindles in horizontal alignment with the corresponding elements of the wiring diagram.

The control system illustrated has been considerably simplified. Such system has been shown because it facilitates disclosure of an application of the invention. It is to be understood that other control elements and safety elements may be added in making up the system and that such system is subject to many variations. For example, the invention may be applied to the control system disclosed in the patent to Waters and Glaser No. 2,074,575, dated March 23, 1937.

Before discussing the timing apparatus, the circuits and mechanisms of Figures 2a and 3 and certain operations of the elevators will first be described.

The electromagnetic switches employed in the circuits illustrated in Figures 2a and 3 are designated as follows:

ASM—Auxiliary stopping switch
BK—Brake resistance relay
BR—Brake
E—Speed switch
EA—Auxiliary speed relay
H—Field and brake switch
NS—Non-stop relay
OS—Operating switch sequence relay
PD—Down direction switch
PR—Auxiliary direction relay
PU—Up direction switch
SM—Stopping magnet
XC—Highest car call relay
XH—Automatic return relay
XS—Highest hall call relay Throughout the description which follows, these letters will be applied to the coils of the above designated switches. Also, with reference numerals appended thereto, they will be applied to the contacts of these switches. Differentiation will be made between the different elevators by appending in Figure 2a to the characters employed to designate the various elements of the control system numbers indicative of the different elevators and arranged in brackets.

The up hall buttons are designated U, while the down hall buttons are designated D. Numerals are appended to these letters indicating the floors for which the buttons are provided, the letter T being appended to the down button at the top floor instead of a number. The hall buttons act through electromagnetic floor relays designated first by the numeral corresponding to the floor for which the floor relay is provided and then by the letter U or D in accordance with whether the floor relay is for an up hall button or a down hall button. Each floor relay, once operated, is retained in operated condition until the registered call is answered. Each floor relay is illustrated as provided with an operating coil and a restoring coil, being latched either mechanically or electromagnetically in operated condition upon energization of the operating coil and reset upon energization of the restoring coil. The car buttons are designated C and, as in the case of the hall buttons, have numerals appended thereto as indicative of the floor for which the car buttons are provided. Each elevator has a car button for each floor above the lower terminal floor. Each elevator also has a non-stop button in the car, designated NSB. As in the case of the electromagnetic switches, differentiation is had between the car buttons and non-stop buttons for different elevators by appending to these characters numbers in brackets. The electromagnetic switches are illustrated in deenergized condition, direction switches PU and PD, which are of the latching type, being shown in reset condition.

Mechanism actuated in accordance with movement of the elevator car is utilized in the control circuits of each elevator. Such mechanism may be in the form of a floor controller or selector machine as indicated in Figure 1 and it will be assumed that the mechanism is of the construction shown in the aforementioned patent to Waters and Glasser No. 2,074,575. Details of this mechanism are not shown as such details are given in the Waters and Glaser patent, to which reference may be made.

Each selector machine is driven preferably by means of a tape attached to the car and counterweight and having teeth formed thereon for engaging teeth on the selector driving wheel, as set forth in the patent to David Carl Larson No. 2,306,816, granted December 29, 1942.

Each selector machine comprises a crosshead which is driven by a screw, which in turn driven by a chain and sprocket in turn driven from the shaft upon which the driving wheel is mounted, to move in accordance with movement of the car for which the machine is provided. The crosshead carries a carriage upon which is mounted mechanism for controlling circuits to cause the car to be slowed down and stopped at a floor. Mechanism is also mounted on the carriage for causing slow down to begin at a certain distance from the floor and for causing the car to be brought to a stop as it arrives at the floor. The carriage is advanced from a neutral position with respect to the crosshead in starting the car and is brought to a stop after a certain amount of movement. Thereafter the carriage moves with the crosshead. When circuits are set up to cause the car to be slowed down, the carriage is brought to a stop. The crosshead, which moves with the car, thereafter takes up the advance of the carriage so that when the car comes to a stop, the carriage is again in neutral. This relative motion of the carriage and crosshead is utilized to control the slow down and stopping of the car.

The advance of the carriage is effected by means of a torque motor which will hereinafter be termed the advancer motor. The circuits of this motor appear in Figure 3 where the motor is designated AM. Energization of the advancer motor is controlled by contacts operated by the stopping magnet. The circuits of this magnet appear in Figures 2a and 3 where the magnet is designated SM. The magnet controls the extension and retraction of pawls carried by the carriage for cooperation with stopping lugs. A stopping lug is provided for each floor and is arranged on a floor bar, these floor bars being spaced in accordance with the distance between the floors for which the lugs are provided. The stopping magnet is energized in the starting operation to effect the retraction of the pawls and in doing so it engages contacts to effect the energization of the advancer motor. The advancer motor in advancing the carriage also effects the engagement of selector switches appearing in Figure 3 and designated SS1 and SS2. When a call is picked up the stopping magnet is deenergized to cause the deenergization of the advancer motor and to extend the pawls for cooperation with the stopping lug for the floor for which the call is registered. The pawl for the direction in which the car is travelling engages the stopping lug, bringing the carriage to a stop. The crosshead continues its upward movement and, due to the relative movement between the crosshead and the carriage, effects the opening of selector switches SS2 and SS1 in sequence to effect the slow down and stopping of the car.

The travelling brushes for each elevator illustrated in Figure 2a are carried by a panel on the carriage of the selector for that elevator. These brushes are arranged to cooperate with stationary contacts for the various floors mounted on the floor bars. When the car is stopped at a floor, the brushes are in engagement with their cooperating stationary contacts for that floor. Being on the advance panel, however, these brushes are advanced in starting the car, are latched in engagement with their contacts for a floor by the pawls when a call is picked up and are maintained in that condition as the advance is taken up as the car comes into the floor.

As in the case of the electromagnetic switches, differentiation between the corresponding elements of the selectors for the different elevators in Figure 2a is made by appending numbers in brackets to the characters employed for these elements. Stationary contacts subject to the car buttons are designated 32, 33, 34, 35 and 36 for floors 2, 3, 4, 5 and 6 respectively, the stationary contacts 31 and 37 for the first and seventh floors being connected directly to the feed line. These contacts are engaged by brush 38. Instead of providing brushes and contacts for the hall call restoring circuits separate from those for the hall call pick up circuits, as is disclosed in the aforementioned Waters and Glaser patent, for convenience the same contacts and brushes are used for both circuits with a switching arrangement to insure the desired sequence of operation. It is to be understood, however, that the same arrangement as disclosed in the Waters and Glaser patent may be employed. The stationary contacts subject to the down hall buttons at the second, third, fourth, fifth, sixth and seventh floors and the stationary contact for the first floor in the call pick up and call restoring circuits are designated 41, 42, 43, 44, 45, 46 and 47 for the first, second, third, fourth, fifth, sixth and seventh floors respectively. These contacts are engaged by brush 48. The stationary contacts subject to the up hall buttons at the first, second, third, fourth, fifth and sixth floors and the stationary contact for the seventh floor in the call pick up and call restoring circuits are designated 51, 52, 53, 54, 55, 56 and 57 for the first, second, third, fourth, fifth, sixth and seventh floors respectively. These contacts are engaged by brush 58. Stationary contacts 61, 62, 63, 64, 65 and 66 for the first, second, third, fourth, fifth and sixth floors respectively are arranged in the highest hall call circuits to be engaged by brush 68.

Each selector has a plurality of hook switches 82, 83, 84, 85 and 86, one for each of floors 2, 3, 4, 5 and 6, mounted on the floor bars for these floors to be engaged by a travelling cam 88 of insulating material also carried by the advancer panel. This cam is of a length to engage and open the hook switch for any particular floor slightly ahead of the engagement of the call pick up brushes with the stationary contacts for that floor when the car is travelling in the up direction and to engage and open the hook switch for the floor below such floor slightly ahead of the engagement of the call pick up brushes with the stationary contacts for such floor when the car is travelling in the down direction. Also, brush 68 in the highest hall call circuit is of a length to engage its stationary contacts slightly ahead of the engagement of the call pick up brushes with their contacts for the corresponding floors when the car is travelling in the up direction. The travelling crosshead of each elevator also carries an additional brush 90 (see Figure 3) for engaging stationary contacts 91 and 92 for the terminal floors. This brush is not advanced with the carriage but moves directly with the crosshead. This has to do with controlling the operation of direction switches PU and PD. An additional hook switch 122 (see Figure 3) is provided on the selector machine. This switch may be arranged to be operated by cam 88(1) so as to be open when the car is at the first floor and closed when it leaves the first floor. For convenience, however, a separate cam 123 (arranged on the advancer panel) is illustrated for operating this switch.

Any suitable form of power supply may be provided for the elevator motor. One of the preferred arrangements is to employ a direct current elevator motor and to cause current to be supplied to the motor at a variable voltage, as from a driven generator in accordance with Ward-Leonard principles. Such arrangement is illustrated in Figure 3 and motor generator sets are shown in Figure 1. It is to be understood that either a direct current or an alternating current motor may be employed to drive the generator, depending upon the kind of power supplied to the building and the character of the installation, and that any suitable control arrangement therefor may be utilized, such, for example, as one embodying the principles of the arrangement disclosed in the patent to Lindquist, Waters and Glaser No. 1,997,260, granted April 9, 1935.

When the generator is driven by an alternating current driving motor, an exciter which may be driven by the driving motor is employed to supply current to the separately excited field windings of the supply generator and the elevator motor and to the brake and the coils of the various electromagnetic switches of Figure 3. In such arrangement, the supply lines of Figure 3 would be connected to the exciter. Also, the call pick up and call restoring circuits and highest call circuits for each elevator would be connected to the respective exciters. The hall button circuits through the operating coils of the floor relays, however, would be subject to the source of supply for the building so as to permit the operation of the floor relays at any time.

The armature of the generator is designated 95, the separately excited field winding being designated 96 and its series field winding 97. The armature of the elevator motor is designated 98 and its separately excited field winging 100. A resistance 101 is provided for controlling the strength of the generator separately excited field and therefore the voltage applied to the elevator motor armature. 102 is a discharge resistance for the brake release coil BR, while resistance 103 serves as a cooling resistance for this coil.

The contacts operated by the car gate and engaged when the gate is closed are designated G. The door contacts operated by the various doors are arranged in series relation. These contacts are not closed until the doors are closed and locked. For convenience these door contacts are shown as a single pair of contacts designated DL. The car gate and hatchway doors for each elevator have not been shown but it is to be understood that they may be power operated, for example as disclosed in the aforementioned patent to Waters and Glaser No. 2,074,575. The start control switch in the car has a plurality of contacts designated 105, 106 and 107. 110 is the safety switch in the car. 120 are service switches for the respective elevators. It will be assumed that the service switches are in the positions illustrated.

The control system is illustrated for the condition where the cars are standing at the first floor. To facilitate understanding of the system, the starting and stopping of car No. 1 will first be described. Assume now that the power is applied to the system. This completes the circuit for the coil of elevator No. 1 non-stop relay NS(1) through elevator No. 1 non-stop button NSB(1). Relay NS(1) upon operation engages contacts NS1(1). Contacts NS1(1) control the circuits for the brushes 48(1) and 58(1) in elevator No. 1 call pick-up and call restoring circuits. The application of power to the system also results in energization of elevator motor field winding 100.

When car No. 1 last arrived at the first floor, brush 90 engaged stationary contact 92 and, upon the engagement of contacts H1 in the stopping operation, a circuit was established for the reset coil of down direction switch PD and for the operating coil of up direction switch PU. This caused the down direction switch to be reset, the condition in which it is shown in the drawings, and the operation of switch PU and latching of this switch in operated condition. The operation of switch PU caused the engagement of contacts PU1(1), PU2, PU3, PU4, PU6, PU7, PU8, PU9 and PU10 and the separation of contacts PU5. Contacts PU1(1) are in the circuit to brush 68(1) so that the engagement of these contacts completes the circuit for the coil of highest down hall call relay XS(1) through the #2 contacts of the floor relays in series (TD2, etc.) contact 61(1), brush 68(1) and contacts PU1(1) and XC1(1). Contacts PU2 are in the circuit for the coil of automatic return relay XH. Contacts PU3 are in the circuit for the coil of auxiliary direction relay PR. Thus, upon the application of power to the system, auxiliary direction switch PR is operated. Contacts PU4 are in the circuit for car button magnet CBM so that this magnet is energized as a result of application of power to the rest of the system. Contacts PU5 disconnect the operating coil of up direction switch PU and the reset coil of down direction switch PD from the feed lines. Contacts PU6 connect field winding AM 125 and armature AM 126 of the advancer motor in parallel. Contacts PU7 control the circuit for the coil of brake and field switch H and contacts PU8 control the circuit for the coil of speed switch E. Contacts PU9 and PU10 prepare the circuit for the generator separately excited field winding 96 for upward travel of the elevator car.

Auxiliary direction relay PR upon operation separates contacts PR1(1) and engages contacts PR2(1). The separation of contacts PR1(1) renders down hall call brush 48(1) ineffective for up car travel, while the engagement of contacts PR2(1) renders the up hall call brush 58(1) effective for up car travel.

To start the car, the start control switch is thrown to full running position. This causes the bridging of contacts 105, 106 and 107, contacts 106 being bridged ahead of contacts 105 and 107. The bridging of contacts 106 completes circuits (not shown) causing the closing of the car gate and first floor hatchway door. It also completes a circuit for the operating coil of stopping magnet SM through contacts OS1 and EA4. The stopping magnet upon operation engages contacts SM1(1), SM2 and SM3. Contacts SM1(1) are in the circuit for the neutralizing coil SM(1) of the stopping magnet. Contacts SM3 complete a holding circuit for the operating coil of the stopping magnet. Contacts SM2 complete a circuit for the coil of auxiliary stopping switch ASM and for one coil of auxiliary speed relay EA. Relay EA does not operate at this time. Switch ASM operates to separate contacts ASM2(1) and to engage contacts ASM1(1), ASM3 and ASM4. Contacts ASM2(1) are in a by-pass circuit for the neutralizing coil SM(1) of the stopping magnet. Contacts ASM3 are in the circuit for the coil of automatic return relay XH. Contacts ASM1(1) are in the circuit from brush 38(1) to coil SM(1). Contacts ASM4 prepare the circuit for the advancer motor AM, which is completed by the bridging of start control switch contacts 105, this circuit being through field winding AM127 and through field winding AM125 and armature AM126 in parallel. This results in the operation of the advancer motor to advance the carriage in the up direction. The advancer motor also effects the engagement of selector switches SS1 and SS2, preparing the circuits for the coils of field and brake switch H and speed switch E and completing the circuit for a second coil of auxiliary speed relay EA.

The energization of both coils of relay EA causes this relay to operate to engage contacts EA1(1) and EA2 and to separate contacts EA3 and EA4. Contacts EA1(1) are in the circuit for the neutralizing coil SM(1) of the stopping magnet, the advance having progressed sufficiently by this time for the brushes to be off the stationary contacts for the floor at which the car is positioned. Contacts EA2 further prepare the circuit for the coil of automatic return relay XH. The separation of contacts EA3 prevents energization of the direction switches once the advancer mechanism has been energized to advance the carriage. Contacts EA4 prevent reoperation of the stopping magnet once a call has been picked up after the car has come to a stop at the floor for which the call is registered. This is especially useful in cases where the advancer mechanism advances the brushes into engagement with their stationary contacts for the floor beyond before starting of the car takes places, as, for example, in the system of the Waters and Glaser patent previously referred to.

The advance takes place fairly rapidly so that, upon the closure of the hatchway door and car gate, a circuit is established for the coil of field and brake switch H through contacts SS1, PU7, up limit switch 108, gate contacts G, door contacts DL, start control switch contacts 107 and safety switch 110.

Switch H upon operation engages contacts H2, H3, H4, H5, H6, H7, H8 and H9 and separates contacts H1 and H10. The separation of contacts H1 prevents operation of the direction switches during operation of the car. Contacts H2 by-pass start control switch contacts 105 in the advancer motor circuit. Contacts H3 complete the circuit for the coil of operating switch sequence relay OS. The operation of operating switch sequence relay OS causes the engagement of contacts OS2 and separates contacts OS1. The purpose of contacts OS1 will be explained later. The engagement of contacts OS2 completes a holding circuit for the coil of auxiliary stopping relay ASM. Contacts H4 by-pass start control switch contacts 107, establishing a self-holding circuit for the coil of switch H. Thus with its contacts all by-passed, the start control switch may be returned to off position. Contacts H5 further prepare the circuit for the coil of speed switch E. Contacts H6 and H7 complete the circuit for brake release coil BR, while contacts H8 and H9 complete the circuit for the generator field winding 96. Contacts H10 disconnect the generator field winding from across the generator armature. The completion of the circuit for the generator separately excited field winding causes current to be supplied from the generaor armature 95 to the hoisting motor armature 98 and, the brake being released as a result of the energization of its release coil BR, the elevator motor starts the car in the up direction.

The brake, upon being released, effects the separation of contacts BR1, which act to remove the short circuit for the coil of brake resistance relay BK. This relay operates to separate its contacts BK2 to insert cooling resistance 103 in circuit with brake release coil BR. It also engages contacts BK1, which completes the circuit for the coil of speed switch E through contacts H5, SS2, PU8, up limit switch 111 and safety switch 110. Switch E upon operation engages contacts E1 to short circuit a portion of resistance 101 in the circuit of the generator field winding 96. This applies full voltage to the generator separately excited field winding, causing the generator voltage to build up to full value to bring the elevator car up to full speed.

Assume that before the start control switch for car No. 1 was thrown to running position to start the car, an intending passenger at the third floor pressed the up third floor hall button U3. This caused energization of the operating coil of up third floor relay 3U. This relay upon operation engages contacts 3U1 and separates contacts 3U2 and is retained in operated condition. The engagement of contacts 3U1 renders stationary contacts 53 alive. The separation of contacts 3U2 breaks the circuit for the coils of highest hall call relays XS. When brush 58(1) engages contacts 53(1) a circuit is completed from line — through restoring coil 3U and contacts 3U1 of the up third floor relay, third floor stationary contact 53(1), brush 58(1), contacts PR2(1) and NS1(1), neutralizing coil SM(1) and contacts EA1(1) and SM1(1), to line +. The neutralizing coil acts to oppose the operating coil of stopping magnet SM, releasing the pawls and causing the separation of contacts SM1(1), SM2 and SM3. Contacts SM1(1) and SM3 break the energizing circuits for the coils of the stopping magnet, while contacts SM2 break the circuit for the coil of the auxiliary stopping switch ASM and one coil of auxiliary speed relay EA. The auxiliary stopping switch separates contacts ASM1(1), ASM3 and ASM4 and reengages contacts ASM2(1). Contacts ASM1(1) disconnect brush 38(1) from line —. Contacts ASM2 short circuit neutralizing coil SM(1) of the stopping magnet. This increases the current supplied to the restoring coil of the up third floor relay 3U, causing this relay to be reset. This permits the reestablishment of the circuit for the coils of highest hall call relays XS. The operation of relay XS(1) to engage contacts XS1, however, does not cause the operation of automatic return relay XH because contacts ASM3 are now separated. Contacts ASM4 deenergize the advancer motor AM. Relay EA does not drop out on deenergization of its coil in series with the coil of switch ASM, being held in operated condition by its coil in parallel with the coil of speed switch E.

As the car continues its upward travel the up pawl, engaging the third floor stopping collar, causes the opening of selector switches SS2 and SS1 in sequence. The opening of switch SS2 breaks the circuit for the coil of speed switch E, which drops out, separating contacts E1 to reinsert resistance 101 in the circuit of the generator separately excited field winding. This decreases the voltage of the generator, causing the car to slow down. The opening of switch SS2 also breaks the circuit for the other coil of relay EA, which drops out to separate contacts EA1(1) and EA2 and to reengage contacts EA3 and EA4. Contacts EA1(1) are in the circuit for the neutralizing coil of the stopping magnet already broken at contacts SM1(1). Contacts EA2 are in the circut for the coil of relay XH, already broken at contacts ASM3. Contacts EA3 further prepare the circuit for the operating coil of down direction switch PD and the reset coil of up direction switch PU. Contacts EA4 are in the initial energizing circuit for the operating coil of stopping magnet SM, this circuit being open at contacts OS1(1).

The opening of switch SS1, which occurs as the car arrives at the landing, breaks the circuit for the coil of field and brake switch H. Switch H, upon dropping out, separates contacts H2, H3, H4, H5, H6, H7, H8 and H9 and reengages contacts H1 and H10. Contacts H2 are in the circuit for the advancer motor AM, which was previously deenergized. Contacts H3, H4 and H5 are in the circuits for the operating coils of magnet SM and switches H and E, which circuits have already been broken. The separation of contacts H6 and H7 deenergizes brake release coil BR and the separation of contacts H8 and H9 disconnects the generator separately excited field winding 96 from the feed lines. Thus the external excitation of the generator is discontinued and the brake is applied to bring the car to a stop at the third floor landing. The engagement of contacts H10 reconnects the separately excited field winding across the generator armature substantially to destroy the residual flux of the generator field.

The separation of contacts H6 and H7 also breaks the circuit for the coil of brake resistance relay BK which drops out to separate contacts BK1 and reengage contacts BK2. Contacts BK1 are in the circuit for the coil of speed switch E, which circuit has already been broken. Contacts BK2 short circuit cooling resistance 103 for the brake release coil in preparation for the next starting operation. The separation of contacts H3 also breaks the circuit for the coil of operating switch sequence relay OS, provided the start control switch has been returned to neutral position. However, if the start control switch is held in position where contacts 106 are bridged, relay OS remains energized upon the separation of contacts H3 so that contacts OS1 remain separated to prevent the reoperation of stopping magnet SM. This prevents a restarting operation unless the start control switch is returned to neutral.

Assume that a passenger enters the car at the third floor desiring to be carried to the fifth floor. Upon the passenger announcing his destination, the attendant presses car button C5(1) which is held in operated condition by magnet CBM. This button not only renders stationary contacts 35(1) "alive" but also completes a circuit through hook switches 85(1) and 86(1) for the coil of highest car call relay XC(1). Relay XC(1), upon operation, separates contacts XC(1) causing the deenergization of the coil of highest hall call relay XS(1). Cam 88(1) engages and opens hook switch 85(1) during advance of the carriage causing the deenergization of relay XC(1). Thus, upon the engagement of brush 68(1) with stationary contact 65(1) the circuit is completed for the coil of highest hall call relay XS(1). Relay XS(1) engages contacts XS1 completing the circuit for the coil of automatic return relay XH. Relay XH, upon operation, engages contacts XH2 to become self-holding and engages contacts XH1(1) to complete a circuit for neutralizing coil SM(1), this circuit also being completed by the engagement of brush 38(1) with stationary contacts 35(1). This causes reset of the stopping magnet, which in turn causes the car to be slowed down and brought to a stop at the fifth floor in the manner previously described.

Relay XH also engages contacts XH4 so that upon the engagement of contacts H1 as the car is brought to a stop at the fifth floor a circuit is completed for the operating coil of down direction switch UD and reset coil of the up direction switch PU. This causes the reset of the up direction switch to separate contacts PU1(1), PU2, PU3, PU4, PU6, PU7, PU8, PU9 and PU10 and the reengagement of contacts PU5. The completion of this circuit also causes the operation and latching of the down direction switch to engage contacts PD4, PD6, PD7, PD8, PD9 and PD10 and to separate contacts PD5. The separation of contacts PU9 and PU10 and the engagement of contacts PD9 and PD10 change over the circuit for the generator field winding for downward car travel. The separation of contacts PU1(1) renders brush 68(1) ineffective for downward travel. The separation of contacts PU2 deenergizes the coil of automatic return relay XH and prevents operation of this relay during downward car travel. The separation of contacts PU3 deenergizes the coil of auxiliary direction relay PR which drops out to separate contacts PR2(1) and engage contacts PR1(1) to render brush 48(1) effective and brush 58(1) ineffective for down car travel. The engagement of contacts PU5 prepares the circuit for automatic reoperation of the direction switches to restore the circuits for upward car travel when the car reaches the lower terminal floor. The separation of contacts PU4 and the engagement of contacts PD4 causes the deenergization and reenergization of the car button magnet CBM, car button C5(1) being released in the transition. The separation of contacts PU6 and engagement of contacts PD6 change over the advancer motor circuits for advancing the carriage in the down direction. The separation of contacts PU7 and the engagement of contacts PD7 transfer the circuit for the coil of switch H so as to be subject to lower terminal limit switch 116 while the separation of contacts PU8 and the engagement of contacts PD8 transfer the circuit for the coils of speed switch E and relay EA so as to be subject to lower terminal limit switch 117.

Thus, with the car set for downward travel at the fifth floor, upon operation of the start control switch to stop the car, it is started in the down direction. It is believed that this operation will be understood from the description given of starting the car in the up direction.

If the car is set for travel in the up direction and the only button pressed for a floor above the car at the time brush 68(1) engages contact 66(1) is the down hall button D6 at the sixth floor, the engagement of this brush and contact completes the circuit for the coil of relay XS(1).

This relay operates as previously described to cause the operation of automatic return relay XH in turn to cause the car to be slowed down and brought to a stop at the sixth floor and to be set for downward travel as it is brought to a stop. Relay XH also separates contacts XH3 to deenergize auxiliary direction relay PR. Relay PR separates contacts PR2(1), rendering brush 58(1) ineffective. It also engages contacts PR1(1), rendering brush 48(1) effective. This completes a circuit through sixth floor stationary contact 46(1) for the restoring coil of the down sixth floor relay 6D, causing this relay to be reset.

If the down sixth floor relay and the up sixth floor relay are both operated, the separation of contacts 6U2 prevents the operation of highest hall call relay XS(1) and thus prevents the operation of automatic return relay XH to set the car for downward travel upon its being brought to a stop at the sixth floor. Furthermore, as relay XH is not operated, contacts XH3 remain separated, preventing the reset of the down floor relay for the sixth floor by the engagement of brush 48(1) with contact 46(1).

Once the car set for upward travel has set up circuits to cause the direction of car travel to be changed to down upon the car being brought to a stop at a floor, that is, once the circuit for the coil of its automatic return relay XH has been completed, the registration of a call for a floor above that floor or of an up hall call for that floor after the establishment of this circuit is ineffective to prevent operation of the direction controlling switches to set the car for downward travel as it comes to a stop. This is due to the fact that automatic return relay XH, upon operation, becomes self holding. Any such call registered by a hall button remains operated under such conditions so that this call is ultimately responded to.

It is believed that it will be seen from the above description that car No. 1, once started in the up direction, continues to travel in the up direction until it reaches the floor for which the highest call, either car call or down hall call or both, is registered, before reversal becomes effective. In case the highest call is an up hall call, the car remains set for upward travel in order that the intending passenger may be taken in the indicated direction. During its travel in the up direction, stops are made in response to calls registered by car buttons for floors intervening the lower terminal and its ultimate destination, and also in response to up hall calls for such intervening floors. The stops are made in the order of succession of floors, regardless of the order in which the calls are registered.

During downward travel of the car, stops are made in response to all car calls and down hall calls that are registered. Up hall calls, however, are answered only by an up travelling car. It is believed that the stops in response to car buttons will be understood from the previous description inasmuch as when a car button is pressed it is maintained operated by the car button magnet CBM so that, upon the engagement of brush 38(1) with the contact rendered alive by this button, the call is picked up and the car is caused to slow down and come to a stop at the floor. Similarly, each down hall button that is pressed operates a down floor relay that remains operated until the contact rendered "alive" thereby is engaged by brush 48(1) to pick up the call. This causes the stopping magnet to drop out, the floor relay to be reset and the car to be slowed down and brought to a stop at the floor at which the button is located. The stops are made in the order of succession of floors regardless of the order in which the calls are registered.

The operation of elevator No. 2 is the same as that of elevator No. 1, previously described. With both cars set for upward travel, each up hall call is answered by the car whose brush 58 is the first to engage its stationary contact for the floor for which the call is registered. The highest down call is answered by the first car whose brush 68 engages its stationary contact for the floor for which the call is registered. If only one hall call remains to be responded to for a floor above the cars, upon its being picked up by one of the cars, the other is automatically caused to slow down and stop at the floor the stationary contact for which is next to be engaged by brush 68 for that car after the reset of the floor relay, or if in engagement with a contact at that time at the floor for which the contact is provided.

Instead of becoming set for down car travel at intermediate floors under conditions such as set forth above, each elevator may be caused to run to the upper terminal before reversing. This may be effected by opening service switch 120 for that elevator, preventing the operation of relay XS. This prevents operation of relay XH, thus preventing the automatic setting of the car for downward travel until the engagement of brush 99 with contact 91 as the car arrives at the upper terminal and contacts H1 reengage.

During either type of operation, it often happens that a car becomes filled to capacity so that it is unable to take on any more passengers until a discharge of passengers has been effected. Under these conditions, the attendant in that car presses his non-stop button NSB, deenergizing the non-stop relay NS for that car. This relay drops out to separate its contacts NS1 rendering brushes 48 and 58 for that car ineffective to pick up calls. The car buttons for that car, however, are not affected by the non-stop button so that these buttons are responded to and stops are made to discharge passengers.

It sometimes happens that traffic conditions are such that several cars may be non-stopped past hall calls with the result that the intending passengers who registered these calls have to wait for undue lengths of time beofe getting service. This situation is likely to occur during peak periods such as incoming morning and noon peaks and outgoing evening and noon peaks. The system is arranged to cause cars to give special response to hall calls which have been registered for more than a certain length of time. To illustrate the principles of the invention, this provision has been made only with respect to down hall calls. The circuits are arranged so that down calls which have remained unanswered for more than a certain time interval are responded to by cars set for upward travel which have no car buttons for higher floors pressed. In responding to such call, the car is brought to a stop at the corresponding floor and is set for travel in the down direction. This operation is effected by timing apparatus and circuits controlled thereby such as shown in Figure 2b or Figure 4.

Referring first to Figure 2b the selector machine for each elevator car has an additional column of contacts which are controlled by timing apparatus. These contacts are provided for the second, third, fourth, fifth and sixth floors and are designated 72, 73, 74, 75 and 76 respectively. These contacts are mounted on the floor bars for the corresponding floors to be engaged by a travelling brush 78. This brush is carried by the advancer panel and is of a length and positioned the same as brush 68. Each elevator is provided with an additional electromagnetic switch designated YS and termed timed down hall call relay. The operation of relay YS for each car is controlled by the engagement of brush 78 for that car with its stationary contacts subject to the control of the timing apparatus. The operation of any relay YS causes the car for which it is provided to be brought to a stop at the floor for which the stationary contact engaged by brush 78 to cause this relay to operate is provided and to be set for travel in the down direction. Differentiation as to elevators is made by appended numerals in brackets as in Figure 2a.

Certain parts of the timing apparatus are individual to the respective floors and certain parts are common to the floors. It is preferred to arrange most of the timing apparatus as a unit and to enclose it, as indicated by Y, to seal it against moisture and dirt and to shield it against extraneous electrostatic and electromagnetic effects. Certain features of the timing apparatus are the subject matter of the copending application of William Henry Bruns, filed June 24, 1944, Serial Number 541,971, since issued as Pat. #2,415,457, while other features are the subject matter of the copending application of William Henry Bruns and Harold Edward Galanty, filed June 24, 1944, Serial Number 541,972, and since issued as Pat. #2,433,424.

The circuits individual to the respective floors are the same for each floor. Referring for example to the circuits for the second floor, the time interval, after which the down call becomes effective to stop a car set for upward travel, is obtained by the discharge of a condenser designated 2C. 2R is a discharge resistance for the condenser. The condenser acts through an electronic tube 2CT, hereinafter referred to as a controlled tube. The circuits are particularly adapted for the utilization of a hot cathode controlled tube which is prevented from firing by a negative bias on the grid 2GR with respect to cathode 2CA provided by the charge on condenser 2C. However, other types of controlled tubes may be employed. The anode of the controlled tube is designated 2AN. 2SG is a shield grid which is connected to the cathode. However, tubes without shield grids may be employed. 2IT is a two element tube arranged in the condenser charging circuit and will hereinafter be termed an isolating tube. 2RI is a current limiting resistance in the condenser charging circuit, the purpose of which will be seen as the description proceeds. 2R3 is a resistance in the circuit for the control grid 2GR, the purpose of which will be seen from later description. An additional pair of contacts 2D3 on the down second floor relay are provided in these circuits external to the unit Y. These contacts when closed complete an auxiliary discharge circuit for the condenser, this circuit also including the isolating tube 2IT. Arranged for selective connection in the plate circuit of the controlled tube is a loading resistance 2R4 and the coil 2TR of an auxiliary time relay. Connected across coil 2TR is a condenser 2C2 and resistance 2R2, the purpose of which will be explained later. Contacts of the auxiliary time relay are designated 2TR1. 2TO and 2TO1 are three position throwover switches for selecting circuits for different operations. The contact arm of switch 2TO1 is connected directly to stationary contacts 72 on the selector machine while the contact arm of switch 2TO is connected to the anode of the controlled tube.

The corresponding elements of the individual circuits of the unit for the other floors are similarly designated, differentiation being had as to floors by numerals corresponding to floor numbers which precede the designating letters. In the case of the auxiliary time relays, those for the floors above the second floor are provided with additional contacts which, for example in the case of the third floor, are designated 3TR2.

As to the circuits common to the various floors, direct current voltage for the plate circuits of the controlled tubes 2CT to 6CT inclusive is provided from the direct current supply lines of Figure 2a. TP is the primary winding of a transformer supplied externally of the unit from a source of alternating current designated AC. TS1, TS2, TS3 and TS4 are secondary windings of this transformer. Secondary windings TS3 and TS4 are for supplying alternating current to the full wave rectifier REC. This rectifier provides direct current for the charging of condensers 2C to 6C inclusive. Filter condenser C8 and load resistance R8 are connected in parallel across the output supply lines RE+ and RE− from the rectifier. Transformer secondary winding TS2 is utilized to supply current to the heater elements of controlled tubes 2CT to 6CT inclusive. For convenience, the heater elements and connections to this secondary winding are not shown.

Alternating current voltage is superimposed on the direct current voltage applied to the plate circuits of the controlled tubes. This superimposed alternating current voltage is provided by transformer secondary winding TS1. The value of this superimposed voltage with respect to the direct current voltage applied to the plate circuits is such as to cause the resultant voltage applied to the tubes to be negative for a fraction of a cycle. This provides positive voltage for a major portion of the cycle and yet enables the grid of each tube to retain control to shut off the tube. Combined alternating and direct current voltage is of advantage for the plate circuits in that it enables the use of standard direct current switches in the plate circuits. This is useful in applying the apparatus to existing elevator installations. However, alternating current voltage alone may be applied to the plate circuits. Alternating current voltage provided by transformer secondary winding TS1 is also superimposed on the direct current voltage provided by condensers 2C to 6C inclusive in the control grid circuits of the corresponding controlled tubes. Condensers C3 and C4 and resistances R3 and R4 constitute a phase shift network for controlling the phase relationship of the superimposed alternating current grid voltage with respect to the plate voltage.

TC is a manually operable time control switch which is part of time control mechanism for the common control of the time interval for all floors. Resistances R1 and R2 are part of the time control mechanism. This mechanism is external to unit Y and may be arranged at the elevator starter's station. R7 is a protective resistance for isolating tubes 2IT to 6IT inclusive. Resistance R9 and condenser C9 are subject to throwover switch TO1 and are effective only in the intermediate position of this switch. When rendered effective, resistance R9 serves as a loading resistance for the cathodes of the controlled tubes, being on the cathode side in a wire common to the cathodes. Condenser C9 serves to delay the decrease in potential drop across resistance R9 when a controlled tube is shut off. Throwover switches TO1, 2TO to 6TO inclusive and 2TO1 to 6TO1 inclusive are operated as a unit. SE1 and SE2 are service switches for connecting in the timing apparatus for operation. The purpose of resistance R10 and condenser C10 connected across the coil of switch YS will be explained later.

When power is applied to lines + and − a charge is caused to be built up on condensers 2C to 6C inclusive to cause negative potential to be applied to the control grids of the controlled tubes sufficient to block the tubes. This is effected by connecting each of the condensers in series with its discharge resistance across resistances R4 and R5. Resistances R4 and R5 in conjunction with resistance R6 constitute a potentiometer resistance connected from line + through transformer secondary winding TS1 to line −. As there is no alternating current voltage in secondary winding TS1 due to switch SE2 being open, direct current voltage is applied to the condensers. The relative ohmic values of these resistances are such that sufficient voltage is applied to the condensers to build up sufficient charge to prevent the firing of any controlled tube, should a floor relay be operated when switches SE1 and SE2 are closed, until sufficient time has elapsed to heat up the cathodes. This prevents disintegration of the cathodes. The amount of voltage applied to the condensers is not sufficient to cause break-down of the isolating tubes 2IT to 6IT inclusive which are connected across the corresponding condensers through resistances 2R1 to 6R1 inclusive respectively and resistances R3 and R7.

Upon the closing of service switches SE1 and SE2 the timing apparatus is rendered effective for operation. The closing of switch SE1 short-circuits resistance R5 to super-impose the alternating current voltage from the phase shift network onto the condenser voltages. The closing of switch SE2 connects the primary winding TP of the transformer to the alternating current source. Secondary windings TS3 and TS4 cause rectifier REC to apply direct current voltage to supply lines RE+ and RE−. The value of this voltage is sufficient to cause break-down of isolating tubes 2IT to 6IT inclusive to effect the further charging of the condensers and thus raise the negative potential of the grids with respect to the cathodes. Taking condenser 2C, for example, as the condenser charge builds up the potential drop across resistance 2R1 decreases until it becomes zero whereupon the isolating tube goes out. The condenser then starts to discharge by way of discharge resistance 2R and resistance until, due to the lowering of the condenser charge, the voltage applied to the isolating tube rises to a point sufficient to break down this tube. This recharges the condenser to a value to cause the isolating tube to extinguish. This cycle of operation is continuously repeated and may be termed a discharge, recharge cycle.

Upon the closure of contacts 2D3, the auxiliary discharge circuit for the condenser is completed. This circuit is through resistance R7. At the same time resistance 2R1 is connected across lines RE+ and RE−. Regardless of the point on the condenser discharge, recharge cycle that this occurs the potential drop across the condenser is sufficient to cause the isolating tube to break down. The current flow is in a direction opposite to that for charging the condenser and, owing to the fact that resistance R7 is of low ohmic value, the condenser discharges immediately to the value of the extinction voltage of the isolating tube. As this point is reached, the isolating tube goes out and the condenser now discharges into discharge resistance 2R and resistance R4. Owing to the high ohmic value of resistance 2R, this discharge takes place slowly, the rate depending upon the value of this resistance. Should the call registered by the down second floor relay be answered and therefore contacts 2D3 separate before the condenser has discharged sufficiently to reduce the negative potential in the control grid to a point to unblock the tube, the condenser immediately recharges and continues its discharge, recharge cycles.

Assume that the call is not answered and contacts 2D3 do not separate before the condenser has discharged sufficiently to reduce the negative potential on grid 2GR with respect to cathode 2CA to a point to unblock the tube. For convenience, assume that voltage is being applied at this time to the plate circuit of the tube. Thus when this point is reached, the tube fires during the positive portion of the next cycle of the voltage applied to the plate circuit of the tube and continues to conduct during this portion of each succeeding cycle. The phase relationship of the alternating current voltage superimposed on the condenser discharge voltage with respect to the voltage applied to the plate circuit of the tube is such as to cause the tube to conduct near the beginning of the positive portion of each cycle of plate voltage. This arrangement causes the tube when it becomes conductive to pass current in the plate circuit the maximum amount of time during each cycle. Upon the subsequent separation of the floor relay contacts, the condenser is recharged and, upon the potential of the grid becoming negative with respect to the cathode a certain amount, the tube is shut off.

In order that the above described operations may be more clearly understood, assume that the direct current voltage of lines + and − is 110 volts, that the peak value of the alternating current voltage superimposed thereon by transformer secondary winding TS1 is 141 volts, and that indirectly heated hot cathode controlled tubes having characteristics suitable for these voltages and which are conductive at a critical grid voltage of approximately −2 volts are utilized. Assume further that the potential across lines RE+ and RE− is 180 volts with condenser C8 a 4 microfarad condenser and with the ohmic value of resistance R3 30,000 ohms and of resistance R7 1,000 ohms. Assume further that each of condensers 2C to 6C inclusive is a 4 microfarad condenser, that each of resistances 2R to 6R inclusive is a 20 megohm resistance and that the characteristics of each of isolating tubes 2IT to 6IT inclusive are such that it breaks down at 85 volts and becomes extinguished at 60 volts. Assume also that each of resistances 2R1 to 6R1 inclusive is a 30,000 ohm resistance and each of resistances 2R3 to 6R3 inclusive is a 10,000 ohm resistance. Assuming that the ohmic values of resistances R5 and R6 are 2 and 1 megohms respectively, condensers 2C to 6C inclusive will be charged from lines + and − to 73 volts.

Upon the closure of switches SE1 and SE2, alternating current voltage is superimposed on direct current supply lines + and −, and the voltage of lines RE+ and RE− breaks down the isolating tubes and further charges the condensers as above described. Referring again to the circuits for the down second floor relay, upon the voltage drop of condenser 2C reaching 120 volts the voltage drop across isolating tube 2IT falls to 60 volts and this tube goes out. The condenser then starts to discharge through resistance 2R. Due to the high ohmic value of this resistance the discharge takes place relatively slowly. Upon the voltage across the condenser falling to 95 volts the voltage across the isolating tube reaches 85 volts causing the tube to break down. As a result, the condenser immediately recharges whereupon the isolating tube goes out and the condenser discharges again. This discharge, recharge cycle is continuously repeated.

Assume now that contacts 2D3 are closed. This may occur at any time during any one of the condenser discharge, recharge cycles. The isolating tube is conducting during the recharge portion of a cycle and, if the engagement of contacts 2D3 occurs then, the condenser voltage reverses the direction of current flow in the isolating tube in effecting the condenser discharge by way of the auxiliary discharge circuit. The isolating tube is not conducting during the discharge portion of a cycle so that, should the engagement of contacts 2D3 occur then, the condenser voltage causes the isolating tube to break down to effect the condenser discharge by way of the auxiliary discharge circuit. In either case, owing to the fact that resistance R7 is of low ohmic value, the potential drop across the condenser drops immediately to the extinction voltage of the isolating tube, namely 60 volts, whereupon the isolating tube goes out. From this point on the condenser discharges slowly into its discharge resistance 2R as before. Upon the separation of contacts 2D3, the condenser is recharged and the discharge, recharge cycles are resumed.

Inasmuch as, upon the engagement of contacts 2D3 the condenser voltage falls immediately to the extinction value of the isolating tube, namely 60 volts, a uniform starting point for the timing operation is had, and as the phase relationship of the superimposed alternating current grid voltage with respect to the plate voltage is such as to cause the tube to start to conduct near the beginning of the positive portion of each cycle of voltage applied to the plate circuit, uniform timing intervals are had.

When the controlled tube fires, the grid potential becomes positive with respect to the cathode and the negative charge on the condenser is reduced. The values of resistances 2R3 and 2R1 are such as to enable, upon the separation of contacts 2D3, the recharging of the condenser to be effected with the result that the tube is shut off when the grid potential becomes 2 volts negative with respect to the cathode. The condenser is recharged to 120 volts and resumes its discharge, recharge cycles. The operation of the timing circuits for each of the other floors is the same.

The length of each timing operation may be varied by varying the value of the phase shift voltage superimposed on the condenser voltage. This is effected by time control switch TC. The position of the time control switch determines the amount of resistance connected in parallel with the right hand portion of resistance R3. In the top position of the time control switch the switch is open, in the next lower position the parallel resistance is R1 of a certain ohmic value, in the next lower position the parallel resistance is R2 of a lower ohmic value, and in the lowermost position the right hand portion of resistance R3 is short circuited. The net result is to decrease the potential drop across the terminals of resistance R3 as the time control switch is moved from its uppermost to its lowermost position, thereby decreasing the value of the phase shift voltage superimposed on the condenser voltage. The lower the value of the phase shift voltage the longer the time interval before the controlled tube is put in condition to conduct. It has been found that, for the characteristics of the circuits and apparatus previously assumed, as to the values of the resistances and condensers of the phase shift network, resistance R3 may be 1750 ohms with the portion to the left of the connection to the time control switch 450 ohms, resistance R4 5,000 ohms, condenser C3 1 microfarad and condenser C4 .25 microfarad. With resistance R1 1,000 ohms and R2 250 ohms, time intervals approximating 1 minute, 1.5 minutes, 2 minutes and 2.5 minutes are obtained in the consecutive positions respectively of the time control switch TC from top to bottom.

For the purposes of further description of operation assume that the throwover switches TO1, 2TO to 6TO inclusive and 2TO1 to 6TO1 inclusive are in uppermost position as illustrated. This connects the anodes 2AN to 6AN inclusive of the controlled tubes with contacts 72 to 76 inclusive respectively of the selector machines. So long as no controlled tube is in condition to fire none of these contacts are alive so that the engagement thereof by their respective brushes 78 does not cause operation of relays YS. However, when the potential of the grid of any tube reaches 2 volts negative with respect to the cathode, that tube is in condition to fire and upon the engagement of any one of the selector machine contacts for the floor for which this tube is provided by its brush 78 when the car for which this brush is provided is set for up travel and is available, the tube is fired and relay YS for that car is operated. This causes the down floor relay for that floor to be reset and the car to be slowed down and stopped at that floor and set for downward travel.

Assume for purposes of more detailed description that the down second floor relay is operated and has not been responded to within the time interval for which the timing apparatus is set. Assume further that the next available car set for upward travel whose brush 78 engages its contact 72 is car No. 1. Upon the engagement of brush 78(1) with contact 72(1) a circuit is completed from line + (Figure 2a) through contacts XC1(1) closed because no car call is registered for a floor above, contacts PU1(1), cross connecting wire W(1), through (Figure 2b) the coil of relay YS(1), brush 78(1), contact 72(1), throwover switch 2TO1, anode 2AN and cathode 2CA of controlled tube 2CT, throwover switch TO1, service switch SE1, and transformer secondary winding TS1, to line —. This causes controlled tube 2CT to fire and thus causes the operation of relay YS(1). Condenser C10(1) in parallel with the coil of relay YS(1) is to obviate the effect of the inductance of the coil and thus retain the negative portion of the cycle of voltage applied to the controlled tube. Resistance R10(1) serves as a current limiting resistance for the condenser. Relay YS(1) upon operation engages contacts YS1 (Figure 3) causing the operation of automatic return relay XH to cause the car to be brought to a stop at the second floor and set for travel in the down direction, and the reset of the down second floor relay, in the manner previously described. The reset of the floor relay as this timed call is picked up prevents the stopping of other cars in response to this call, puts out controlled tube 2CT and recharges condenser 2C for resumption of its discharge, recharge cycles.

Stops at other floors in response to timed calls by cars set for upward travel are effected in a similar manner. In each case the timed call is responded to by the first available car set for upward travel in effect to reach the floor for which such is registered, i. e., to engage the stationary contact for that floor by its brush 78. In case there are timed calls for more than one floor which have not in effect been reached by an available up car with no other available car in position to respond to these calls as timed calls, such car answers the call for the lowest of these floors. This is considered desirable operation to meet the traffic problems of buildings in which such timed calls which remain unanswered for undue lengths of time are most likely to occur at the lower floors.

In some buildings traffic conditions might be such that it would be considered preferable where two or more timed calls exist with only one available car in position to answer them to cause the car to answer the highest of such calls. This operation may be had in the arrangement illustrated by moving the throwover switches from uppermost to lowermost position. With the throwover switches in lowermost position, upon the expiration of the time interval for any down call, the controlled tube for that call fires immediately to cause operation of the corresponding auxiliary time relay TR. Assume for example that the down second floor relay 2D is operated and has not been responded to within the time interval for which the timing apparatus is set. As this time interval expires a circuit is completed from line + through the coil of second floor auxiliary time relay 2TR, throwover switch 2TO, through controlled tube 2CT, throwover switch TO1, service switch SE1, transformer secondary winding TS1, to line —. Condenser 2C2 and resistance 2R2 in parallel with the coil of relay 2HR serve the same purpose as condenser C10 and resistance R10. The completion of this circuit fires the tube and thus causes the immediate operation of this auxiliary time relay which engages contacts 2TR1 to render second floor stationary contacts 72 alive. Thereafter, upon the first engagement of a brush 78 for a car set for upward travel with its contact 72, a circuit is completed for the coil of relay YS for that car through throwover switch 2TO1, contacts 2TR1 and contacts 3TR2 to 6TR2 inclusive, to line —. This causes that car to be brought to a stop at the second floor and set for travel in the down direction and reset of the down second floor relay as the call is picked up, in the manner previously described. However, assume that a down call is also registered for the fourth floor and is not responded to within the time interval of the timing apparatus so that the fourth floor auxiliary time relay 4TR also is operated. Relay 4TR by the separation of contacts 4TR2 breaks the circuit from line — to all selector stationary contacts for floors below the fourth floor so that none of contacts 72 are effective to cause operation of any of the corresponding relays YS. Thus, assuming further that there is no car set for upward travel which in effect has not reached the fourth floor other than car No. 1 and that this car also has not yet in effect reached the second floor. Upon the engagement of brush 78(1) with stationary contact 72(1), relay YS(1) is not operated as contact 72(1) is not alive. However, upon the engagement of brush 78(1) with stationary contact 74(1) relay YS(1) is operated causing the car to be brought to a stop at the fourth floor and set for downward travel and the fourth floor down call to be reset as the call is picked up. The reset of the timed fourth floor down call causes the recharging of condenser 4C to restart the discharge, recharge cycles. As the potential of the grid of controlled tube 4CT with respect to the cathode becomes 2 volts negative, the tube is shut off. This causes deenergization of relay 4TR which reengages contacts 4TR2 to reconnect stationary contacts 72 to line —, thus enabling the down call at the second floor to be responded to as a timed call.

It may be considered desirable for certain installations to cause, where two or more calls exist which have remained unanswered for more than a certain length of time, the one which has been registered the longest to be responded to as a timed call first. In other words, where a plurality of such unanswered calls exist, such calls are responded to as timed calls in the order in which the calls were registered. This operation may be had in the arrangement illustrated by moving the throwover switches to intermediate position. This connects the anodes of the controlled tubes both to the loading resistances corresponding thereto and to the corresponding contacts on the selector machine. It also removes the shunt for resistance R9 and its parallel condenser C9 rendering them effective. Assuming each of loading resistances 2R4 to 6R4 inclusive is of an ohmic value of 20,000 ohms, resistance R9 would be a 4,000 ohm resistance and condenser C9 a 50 microfarad condenser. When a controlled tube becomes conducting, resistance R9 acts to delay the firing of any other tube until after the conducting tube is shut off, while condenser C9 acts to cause the next tube to fire to be the one for which the floor relay has been operated longest. In other words, when a plurality of floor relays have been or become operated for the prescribed period, only one controlled tube can be conducting at a time and the order in which they become conductive is the order in which the floor relays were operated. Resistance R9 and condenser C9 are connected in the common wire leading from line — to the cathodes of the controlled tubes. Thus, when floor relay contacts for one floor have been in engagement for the prescribed length of time to cause the corresponding controlled tube to conduct, current flows through cathode loading resistance R8. This raises the potential of the cathodes of all controlled tubes to block all of such tubes except the one which has fired.

Assume, for example, that the first down call to be registered for a certain length of time is the down call for the second floor. As previously explained, at the expiration of this time period, the negative bias on the control grid of tube 2CT is reduced sufficiently by the condenser discharge to enable the tube to fire. Inasmuch as the anode 2AN of this tube is connected through throwover switch 2TO and loading resistance 2R4 to line +, the tube fires immediately. The anode is also connected through throwover switch 2TO1 to stationary contacts 72 of the selector machines so that the firing of the tube renders these contacts alive. Inasmuch as the plate circuit of tube 2CT is through cathode resistance R8, current flow in this circuit causes a voltage drop across this resistance. As to each of controlled tubes 3CT to 6CT inclusive, this voltage drop raises the potential of the cathode in a positive direction with respect to the control grid. This in effect is the same as increasing the negative bias of the grid with respect to the cathode. This blocks tubes 3CT to 6CT inclusive so that should one or more down calls for floors three to six inclusive be registered, when the time interval expires for the tube controlled by each such down call, the tube does not fire so long as tube 2CT is conducting. For the voltage values and characteristics previously assumed, the voltage drop across resistance R9 when a tube fires would be about 17 volts which means that the condensers for other tubes would have to discharge an additional 17 volts before the tubes controlled thereby could also fire. As this voltage difference exists in the range of condenser discharge where the voltage change is relatively slow, the delay in the firing of other tubes is more than ample to insure the answering of the call corresponding to the tube already conducting. As to controlled tube 2CT, when it fires it immediately drains timing condenser 2C as grid resistance 2R3 is of relatively low ohmic value. Thus, although the cathode potential of tube 2CT is raised in a positive direction, the grid potential is raised in a positive direction at the same time enabling this tube to continue to conduct.

When the down call at the second floor is answered, contacts 2D3 separate and condenser 2C is recharged, as previously described, to shut off tube 2CT. If the time interval for another call has expired the lowering of the voltage across resistance R9, due to tube 2CT being shut off, causes the controlled tube for this next timed call to fire, rendering the corresponding stationary contacts of the selector machine alive and blocking the other tubes. At the time controlled tube 2CT is shut off should there be more than one down call registered, the time interval for each of which has expired, condenser C9 delays the lowering of the voltage drop across resistance R9 sufficiently to insure the firing of only the controlled tube corresponding to the longest remaining timed call. The delay provided by condenser C9 assures ample time for this controlled tube to ionize and thus fire before the difference in potential between cathode and grid of another tube can become low enough to cause that tube to fire. Thus, only one tube conducts at a time and the firing of the controlled tubes in the order in which unanswered timed calls were registered is assured.

It will be seen, therefore, that when a timed call exists, such call is picked up by an available car set for upward travel. The particular timed call which is responded to, in case the time interval for more than one unanswered timed call has expired, is dependent upon the position of the throwover switches. These timed calls are responded to even though untimed calls exist for floors above since the timed call renders the corresponding contacts of contacts 72 to 76 inclusive alive. Thus relay YS for a car is able to operate to cause the car to be brought to a stop at a floor in response to a timed call for that floor even though due to the separation of floor relay contacts for floors above in the series circuit through contacts 2D2 to TD2 inclusive, the operation of relay XS for that car is prevented. It will be understood from previous description that whenever a car is stopped at a floor in response to a timed call and is set for travel in the down direction, it stops on its downward trip in response to down calls for floors below. Also any timed down call may be picked up as an untimed call by a car in the regular course of operation. Whenever a call is picked up, either as a timed call or as an untimed one, the floor relay is reset so that the call ceases to exist either as a timed or untimed call. When such reset is effected the corresponding selector contacts are no longer alive, enabling other cars to continue past the floor to respond to calls for floors above.

The arrangement by which the timing apparatus controls the operation of the elevator cars is subject to considerable variation. For example, instead of an additional column of stationary contacts 72 to 76 inclusive on each selector subject to the timing apparatus, the timing apparatus may be arranged to act through contacts 62 to 66 inclusive in which event relays YS are omitted and relays XS are utilized in responding to timed calls. Such an arrangement is illustrated in Figure 4 in which the control circuits for the coils of the XS relays are included. The circuits for controlling the potential of the control grids of the controlled tubes are the same in Figure 4 as in Figure 2b, the variation being in the circuits controlled by the tubes. The coils of auxiliary time relays TR are connected directly to the anodes of the corresponding controlled tubes. With this arrangement, resistance R9 would be of a smaller ohmic value than 4,000 ohms when the resistance of the coils of relays TR is less than 20,000 ohms. In such case condenser C9 would be of a larger capacity. Breaking contacts 3TR2 to 6TR2 inclusive of auxiliary time relays 3TR to 6TR inclusive are arranged in the circuit from line + to the coils of the auxiliary time relays. The effectiveness of these breaking contacts is controlled by throwover switches 3TO1 to 6TO1 inclusive. Thus, when these throwover switches are in position to render these contacts effective, the operation of any one of the auxiliary time relays breaks the feed circuit for the coils of the auxiliary time relays for all floors below. Each of the auxiliary time relays is provided with an additional pair of contacts, 2TR3 to 6TR3 inclusive. These contacts, along with making contacts 2TR1 to 6TR1 inclusive of the auxiliary time relays, control the circuits for rendering stationary contacts 62 to 66 inclusive of the selector machines alive by the timing apparatus. These circuits lead to an ungrounded negative line designated UG which is utilized to provide a higher voltage for operating relays XS under control of the timing apparatus than that for operating relays XS under control of the No. 2 contacts of the floor relays. Each of service switches 120 is arranged in shunt to a resistance R11.

As before throwover switches TO1 and 3TO1 to 6TO1 inclusive are operated as a unit. With these throwover switches in the position illustrated, each timed call is responded to by the next available car set for upward travel in effect to reach the floor for which such call is registered, as in the case of the circuits of Figure 2b with the throwover switches in the corresponding position. Assume, for example, that the down fourth floor relay is operated and has not been responded to within the time interval for which the timing apparatus is set. Upon the expiration of this time interval, tube 4CT fires to cause the operation of auxiliary time relay 4TR. This relay, upon operation, separates contacts 4TR3 and 4TR2 and engages contacts 4TR1. Contacts 4TR2 are bypassed by throwover switch 4TO1. The engagement of contacts 4TR1 connects stationary contacts 64 to negative line UG, rendering these contacts alive. Contacts 4TR3 disconnect the series circuit of back contacts 2D2 to TD2 inclusive of the floor relays from selector contacts 64 to prevent the stopping of another car at another floor in response to this timed call by unwanted circuits. Assume further that the next available car set for upward travel whose brush 68 engages its contact 74 is car No. 1. This engagement completes a circuit from line + through contacts XC1(1) and PU(1), switch 120(1), coil of relay XS(1), brush 68(1), contact 64(1), contacts 4TR1 to negative line UG. Relay XS(1) operates to cause the car to be brought to a stop at the fourth floor and set for travel in the down direction, and the reset of the down fourth floor relay, in the manner previously described. The reset of this floor relay as the timed call is picked up prevents the stopping of other cars in response to this call, shuts off controlled tube 4CT and recharges condenser 4C for resumption of its discharge, recharge cycles.

With the throwover switches moved to the farthermost clockwise position, the by-pass for each of auxiliary time relay contacts 3TR2 to 6TR2 inclusive is removed. Thus, whenever an auxiliary time relay for a floor above the second floor is operated its contacts separate to prevent a complete circuit through the coils of the auxiliary time relays for floors below. Assume, for example, that time relay 4TR is operated to separate contacts 4TR2. This breaks the circuit from line + to the coils of auxiliary time relays 3TR and 2TR, preventing the operation of either of these relays should a call be registered for the corresponding floor, the time interval for which has expired. Also should either of these time relays have been operated at the time relay 4TR is operated, such relay is caused to drop out until the down call at the fourth floor is answered. With this arrangement when two or more timed calls exist with only one available car in position to answer them, that car is caused to answer the highest of such calls.

By moving the throwover switches to intermediate position, the operation is changed so that where two or more timed calls exist, the one which has been registered the longest is responded to first as a timed call. With the throwover switches in intermediate position, auxiliary time relay contacts 3TR2 to 6TR2 inclusive are short-circuited but the short-circuit for resistance R9 and condenser C9 is removed. Thus, when the time interval for a down call has expired, the firing of the tube controlled thereby blocks the other tubes, as described in connection with Figure 2b, until this call has been responded to either as a timed call or as an untimed call by one of the cars in the regular course of operation. As soon as such call is responded to, the other controlled tubes are unblocked and if other down calls exist, the time interval for which has expired, the controlled tube for the one which has existed the longest is the tube which is fired, blocking the other tubes as before. In other words, the controlled tubes are fired in the order in which the unanswered timed calls were registered. Regardless of the manner in which the timed calls are responded to and whether such call is responded to as a timed call or as an untimed one, the reset of the floor relay incident to the picking up of such call causes the corresponding auxiliary time relay to drop out, thus enabling other cars set for upward travel and in effect below the floor corresponding to such timed call to be subject to the floor relay contacts (2D2 to 7D2 inclusive) for floors above and thus to respond to calls for floors above.

When it is desired to have one or more cars in regular operation always travel to the upper terminal before becoming set for downward travel, this may be done by opening service switches 120 for such cars. This places resistance R11 for each car in circuit with the coil of relay XS for that car. The value of this resistance is such as to prevent the operation of this relay by the voltage existing between line + and grounded line —. However, the voltage between line + and ungrounded line UG is high enough to cause the operation of relay XS with resistance R11 in circuit so that a timed call for an intermediate floor may be responded to by an available car set for upward travel. Such call is picked up by the engagement of brush 78 for such car with the corresponding selector contact, causing the car to be brought to a stop at such intermediate floor and to be set for travel in the down direction. Thus when a timed call is responded to by a car, that car does not run to the upper terminal. In the event that it is not desired to arrange the system so that cars are caused to travel to the upper terminal, service switches 120 and resistances R11 controlled thereby are omitted and the negative line UG may be connected to grounded line —, thereby eliminating the higher voltage for operating the XS relays.

Not only is the arrangement by which the timing apparatus controls the operation of the elevator car subject to considerable variation but also the timing apparatus itself may be considerably varied. This includes not only variation in the form of the electronic device illustrated but also an entirely different type of timing apparatus such as one in which the timing is mechanically obtained.

The invention may be employed in elevator systems in which the cars are arranged to serve floors in certain zones, as for example in the patent to William F. Glaser, No. 2,215,098, granted September 17, 1940. The invention also may be applied to elevator control systems in which scheduling mechanism is provided to cause the giving of starting signals to start the cars as for example in accordance with the arrangement of the patent to Gavin Watson, No. 2,284,113, granted May 26, 1942. The invention is also applicable to systems of control in which the starting as well as the stopping of the cars is controlled by push buttons in the cars and at the landings and in which for example a car when fully loaded is automatically non-stopped past hall calls. It is also applicable to systems in which the hall buttons, instead of controlling the stopping of the cars advise the car attendants by signals as to the floors at which stops are to be made. Also certain features of the invention are applicable to systems of control for only one elevator.

It is to be understood that signal apparatus may be included to advise the car attendants and intending passengers as to the direction in which the respective cars will start from the landings so that, when an up travelling car responds to a down timed call, both the car attendant and intending passengers are advised that the car will leave the landing in the down direction. This may be done as by providing a direction light in each car and an up hall lantern and a down hall lantern at each intermediate landing for each car, as done for example in the aforementioned Waters et al patent in which the direction lights in the cars are designated 379. With such arrangement, when an up travelling car stops in response to a timed down call, the direction light in the car is extinguished and the down hall lantern for that car at that landing is lighted, advising both the attendant and intending passengers that the car will start from the landing in the down direction.

It is contemplated that many of the features of the invention disclosed may be used in connection with apparatus and circuits different from those specifically described and also in connection with other forms of elevator control. The system of control admits of many variations and many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. A control system for an elevator car in which control means is provided at each of a plurality of landings for registering a call for such landing and in which means is provided which is operable to cause the stopping of the car during its travel in a given direction at landings in response to calls registered by said control means for said landings, characterized in that time controlled means is provided which is operable to cause the stopping of the car during its travel in the opposite direction at a landing in response to a call registered by said control means for that landing when such call remains unanswered for more than a certain period of time.

2. A control system for an elevator car in which a hall button is provided at each of a plurality of landings for registering a call for such landing and in which means is provided for stopping the car during its travel in a given direction at landings in response to calls for such landings, characterized in that means is provided which is operable to stop the car during its travel in the opposite direction at a landing in response to a call for that landing which remains registered for more than a certain period of time, even though a call which has not been registered for more than said certain period of time exists for a landing beyond.

3. A control system for an elevator car in which a hall button is provided at each of a plurality of landings for registering a call for such landing and in which means is provided for stopping the car during its travel in a given direction at landings in response to calls for such landings and for stopping the car during its travel in the opposite direction at a landing in response to a call for such landing provided no call is registered for a landing beyond, characterized in that time controlled means is provided which is operable to stop the car during its travel in said opposite direction at a landing in response to a call for that landing which remains registered for more than a certain period of time, regardless of whether or not any call which has not been registered for more than said certain period of time exists for a landing beyond.

4. A control system for an elevator car in which a hall button is provided at each of a plurality of landings for registering a call for such landing, in which a car button for each landing is provided in the car for registering a call for such landing and in which means is provided for stopping the car during its travel in a given direction in response to calls registered by hall buttons and car buttons at landings for which such calls are registered and during its travel in the opposite direction in response to calls registered by car buttons at landings for which such calls are registered, characterized in that means is provided which is operable during travel of the car in said opposite direction to stop the car in response to a call registered by a hall button which has remained unanswered for a predetermined length of time at the landing for which such call is registered even though one or more calls registered by hall buttons exist for landings beyond, provided no call registered by a car button exists for any landing beyond.

5. A control system for an elevator car in which an up hall button is provided at each of a plurality of landings for registering an up call for such landing, in which a down hall button is provided at each landing for registering a down call for such landing and in which means is provided for stopping the car during its travel in the down direction in response to down calls at landings for which such calls are registered and during its travel in the up direction in response to up calls at landings for which such calls are registered, characterized in that time controlled means is provided which is operable during travel of the car in the up direction to stop the car in response to a down call which has been registered for more than a certain period of time at the landing for which such call is registered.

6. A control system for an elevator car in which an up hall button is provided at each of a plurality of landings for registering an up call for such landing, in which a down hall button is provided at each landing for registering a down call for such landing, in which a car button for each landing is provided in the car for registering a call for such landing and in which means is provided for stopping the car during its travel in the down direction in response to down calls and to calls registered by car buttons at landings for which such calls are registered and during its travel in the up direction in response to up calls and to calls registered by car buttons at landings for which such calls are registered, characterized in that time controlled means is provided which is operable during travel of the car in the up direction when a down call has remained unanswered for a predetermined length of time to stop the car in response to such down call at the landing for which such call is registered.

7. A control system for an elevator car in which an up hall button is provided at each of a plurality of landings for registering an up call for such landing, in which a down hall button is provided at each landing for registering a down call for such landing, in which a car button for each landing is provided in the car for registering a call for such landing and in which means is provided for stopping the car during its travel in the down direction in response to down calls and to calls registered by car buttons at landings for which such calls are registered and during its travel in the up direction in response to up calls and to calls registered by car buttons at landings for which such calls are registered and in response to a down call at the landing for which such call is registered provided no call is registered for a landing beyond and the up call for such landing is not registered, characterized in that means responsive to a down call which has remained registered for more than a certain period of time is provided for stopping the car during its travel in the up direction at the landing for which such call is registered, regardless of whether or not the up call is registered for that landing or any call registered by a hall button exists for a landing above.

8. A control system for an elevator car in which a hall button is provided at each of a plurality of landings for registering a call for such landing and in which means is provided for stopping the car during its travel in a given direction in response to calls at landings for which such calls are registered, characterized in that means is provided which is operable during travel of the car in the opposite direction when a call has remained unanswered for a predetermined length of time to stop the car in response to such call at the landing for which such call is registered even though a call is registered for a landing beyond, and when two or more calls have remained unanswered for a predetermined length of time and are for landings ahead of the car, to stop the car in response to a certain one of said calls at the landing for which such call is registered.

9. A control system for an elevator car in which a hall button is provided at each of a plurality of landings for registering a call for such landing and in which means is provided for stopping the car during its travel in a given direction in response to calls at landings for which such calls are registered, characterized in that means is provided which is operable during travel of the car in the opposite direction when a call has remained unanswered for more than a predetermined length of time to stop the car in response to such call at the landing for which such call is registered and when two or more such calls have remained unanswered for a predetermined length of time and are for landings ahead of the car, to stop the car in response to that one of said calls for the landing first to be reached by the car.

10. A control system for an elevator car in which a hall button is provided at each of a plurality of landings for registering a call for such landing and in which means is provided for stopping the car during its travel in a given direction in response to calls at landings for which such calls are registered, characterized in that means is provided which is operable during travel of the car in the opposite direction when a call has remained unanswered for more than a predetermined length of time to stop the car in response to such call at the landing for which such call is registered and when two or more such calls have remained unanswered for a predetermined length of time and are for landings ahead of the car, to stop the car in response to the unanswered call for that one of the landings for which such unanswered calls are registered which is farthest in said opposite direction from the car even though calls which have not been registered for more than said predetermined length of time exist for landings beyond.

11. A control system for an elevator car in which a hall button is provided at each of a plurality of landings for registering a call for such landing and in which means is provided for stopping the car during its travel in a given direction in response to calls at landings for which such calls are registered, characterized in that means is provided which is operable during travel of the car in the opposite direction when a call has remained unanswered for more than a predetermined length of time to stop the car in response to such call at the landing for which such call is registered and when two or more such calls have remained unanswered for a predetermined length of time and are for landings ahead of the car, to stop the car in response to the first of such calls that was registered.

12. A control system for an elevator car in which an up hall button is provided at each of a plurality of landings for registering an up call for such landing, in which a down hall button is provided at each landing for registering a down call for such landing, in which a car button for each landing is provided in the car for registering a call for such landing, in which means is provided for stopping the car during its travel in the up direction in response to calls registered by up hall buttons and car buttons at landings for which such calls are registered and during its travel in the down direction in response to calls registered by down hall buttons and car buttons at landings for which such calls are registered and in which starting means are provided in the car for starting the car after each stop, characterized in that means is provided which is operable during travel of the car in the up direction when a call registered by a down hall button has remained unanswered for a predetermined length of time and provided no car call is registered for a landing above to stop the car in response to such unanswered call at the landing for which such call is registered even though a call registered by a hall button exists for a landing above and when two or more calls registered by down hall buttons have remained unanswered for a predetermined length of time and are for landings in effect above the car and provided no car call is registered for a landing above to stop the car in response to that one of said unanswered calls for the landing farthest above the car even though a call registered by a hall button exists for a landing above, and that means is also provided which is operable when a stop is made during travel of the car in the up direction in response to any of said unanswered calls to change the direction of travel of the car to down upon the car being brought to a stop.

13. A control system for an elevator car in which an up hall button is provided at each of a plurality of landings for registering an up call for such landing, in which a down hall button is provided at each landing for registering a down call for such landing, in which a car button for each landing is provided in the car for registering a call for such landing, in which means is provided for stopping the car during its travel in the up direction in response to calls registered by up hall buttons and car buttons at landings for which such calls are registered and during its travel in the down direction in response to calls registered by down hall buttons and car buttons at landings for which such calls are registered and in which starting means are provided in the car for starting the car after each stop, characterized in that means is provided which is operable during travel of the car in the up direction when a call registered by a down hall button has remained unanswered for a predetermined length of time and provided no car call is registered for a landing above to stop the car in response to such unanswered call at the landing for which such call is registered even though a call registered by a hall button exists for a landing above and when two or more calls registered by down hall buttons have remained unanswered for a predetermined length of time and are for landings in effect above the car and provided no car call is registered for a landing above to stop the car in response to the first of such calls that was registered, and that means is also provided which is operable when a stop is made during travel of the car in the up direction in response to any of said unanswered calls to change the direction of travel of the car to down upon the car being brought to a stop.

14. A control system for an elevator car in which an up hall button is provided at each of a plurality of landings for registering an up call for such landing, in which a down hall button is provided at each landing for registering a down call for such landing, in which a car button for each landing is provided in the car for registering a call for such landing, in which means is provided for stopping the car during its travel in the up direction in response to calls registered by up hall buttons and car buttons at landings for which such calls are registered and during its travel in the down direction in response to calls registered by down hall buttons and car buttons at landings for which such calls are registered and in which starting means are provided in the car for starting the car after each stop, characterized in that means is provided which is operable during travel of the car in the up direction when a call registered by a down hall button has remained unanswered for a predetermined length of time and provided no car call is registered for a landing above to stop the car in response to such unanswered call at the landing for which such call is registered even though a call registered by a hall button exists for a landing above and when two or more calls registered by down hall buttons have remained unanswered for a predetermined length of time and are for landings in effect above the car and provided no car call is registered for a landing above to stop the car in response to that one of said unanswered calls for the landing first to be reached by the car, and that means is also provided which is operable when a stop is made during travel of the car in the up direction in response to any of said unanswered calls to change the direction of travel of the car to down upon the car being brought to a stop.

15. A control system for an elevator car serving a plurality of landings comprising; means for each landing for registering a call for travel in a certain direction; means responsive to said calls that are registered to cause the stopping of the car during its travel in said certain direction at the landings for which such calls are registered; and means for a landing effective in response to a call registered by said call registering means for that landing which remains unanswered for more than a certain period of time to cause the stopping of the car at that landing during its travel in the opposite direction, but ineffective to cause the stopping of the car in response to a call registered by said call registering means for that landing which has remained unanswered for less than said certain period of time.

16. A control system for an elevator car serving a plurality of landings comprising; means for each landing for registering a call for travel in a certain direction; means responsive to said calls that are registered to cause the stopping of the car during its travel in said certain direction at the landings for which such calls are registered; means for each landing rendered effective in response to a call registered by said call registering means for that landing which remains unanswered for more than a certain period of time to cause the stopping of the car at that landing during its travel in the opposite direction, but being ineffective to cause the stopping of the car in response to a call registered by said call registering means for that landing which has remained unanswered for less than said certain period of time; and means operable when the car makes such stop in response to a call which has remained unanswered for more than said certain length of time to set the car for travel in said certain direction.

17. A control system for an elevator car serving a plurality of landings comprising; means for each landing for registering a call for travel in a certain direction; means responsive to said calls that are registered for stopping the car during its travel in said certain direction at the landings for which such calls are registered; means responsive to any one of said calls that is registered for stopping the car during its travel in the opposite direction at the landing for which such call is registered, provided such call has remained unanswered for more than a certain length of time; and means for controlling the type of service so that when two or more calls have remained unanswered for more than said certain length of time the first of such calls to be responded to is for that landing of those for which such calls are registered which for one type of service is first to be reached by the car, which for another type of service is farthest in said opposite direction or for which for still another type of service such call was registered first.

18. An elevator system in which an elevator car serves a plurality of landings comprising; means for each landing for registering a call for travel in a certain direction; an electroresponsive device; means operable during travel of the car in said certain direction for causing operation of said electroresponsive device in response to any one of said calls upon the car arriving at a certain distance from the landing for which such call is registered regardless of the length of time that such call remains unanswered; means rendered effective in response to any one of said calls which remains unanswered for more than a certain period of time to cause operation of said electroresponsive device upon the car during its travel in the opposite direction arriving at a certain distance from the landing for which such call is registered, but being ineffective to cause operation of said electroresponsive means in response to any one of said calls which has remained unanswered for less than said certain period of time and means for stopping the car, upon operation of said electroresponsive device in response to a call, at the landing for which such call is registered.

19. A control system for an elevator car serving a plurality of landings comprising; means for each landing for registering a call for that landing; means responsive to said calls that are registered for stopping the car during its travel in a certain direction at the landings for which such calls are registered; and timing means for rendering any one of said calls that has remained unanswered for more than a certain length of time effective to cause operation of said stopping means to stop the car during its travel in the opposite direction at the landing for which such call is registered.

20. control system for an elevator car serving a plurality of landings comprising; a down hall button at each landing; means for each hall button and responsive to the pressing thereof for registering a down call for the landing for which the hall button is provided; means responsive to said calls that are registered for stopping the car during its travel in the down direction at the landings for which such calls are registered; and timing means for rendering any one of said calls that has remained unaswered for more than a certain length of time effective to cause operation of said stopping means to stop the car during its travel in the up direction at the landing for which such call is registered.

21. A control system for an elevator car serving a plurality of landings comprising; a hall button at each landing; means for each hall button and responsive to the pressing thereof for registering for the landing for which the hall button is provided a hall call for travel in a certain direction; a car button for each landing in the car for registering a car call for such landing; stopping means for the car; means responsive to hall calls that are registered for causing operation of said stopping means to stop the car during its travel in said certain direction at the landings for which such hall calls are registered; timing means for rendering any one of said hall calls that has remained unanswered for more than a certain length of time effective to cause operation of said stopping means to stop the car during its travel in the opposite direction at the landing for which such hall call is registered; and means responsive to car calls that are registered for causing operation of said stopping means to stop the car during its travel in either direction at the landings for which such car calls are registered and for preventing operation of said stopping means in response to a hall call that has remained unanswered for more than a certain length of time to stop the car during its travel in said opposite direction at the landing for which such hall call is registered when one or more car calls are registered for landings beyond.

22. A control system for an elevator car serving a plurality of landings comprising; a down hall button at each landing; down call registering means for each landing responsive to the pressing of the down hall button for such landing for registering a down hall call for such landing; a car button for each landing in the car for registering a car call for such landing; stopping means for the car; means responsive to down hall calls that are registered for causing operation of said stopping means to stop the car during its travel in the down direction at the landings for which such down hall calls are registered; means responsive to car calls that are registered for causing operation of said stopping means to stop the car during its travel in either direction at the landings for which such car calls are registered; timing means for rendering any one of said down hall calls that has remained unanswered for more than a certain length of time effective to cause operation of said stopping means to stop the car during its travel in the up direction at the landing for which such down hall call is registered; and means controlled by car calls for preventing the stopping of the car in its travel in the up direction by said stopping means in response to a down hall call that has remained unanswered for more than a certain length of time when one or more car calls are registered for landings above the landing for which such down hall call is registered.

23. A control system for an elevator car serving a plurality of landings comprising; a down hall button at each landing; down call registering means for each landing responsive to the pressing of the down hall button for such landing for registering a down hall call for such landing; an up hall button at each landing; up call registering means for each landing responsive to the pressing of the up hall button for such landing for registering an up hall call for such landing; a car button for each landing in the car for registering a car call for such landing; stopping means for the car; means responsive to down hall calls that are registered for causing operation of said stopping means to stop the car during its travel in the down direction at the landings for which such down hall calls are registered; means responsive to up hall calls that are registered for causing operation of said stopping means to stop the car during its travel in the up direction at the landings for which such up hall calls are registered; means responsive to car calls that are registered for causing operation of said stopping means to stop the car during its travel in either direction at the landings for which such car calls are registered; means controlled by said down hall calls for rendering any one of them that has remained unanswered for more than a certain length of time effective to cause operation of said stopping means to stop the car during its travel in the up direction at the landing for which such down hall call is registered even though one or more hall calls are registered for landings above; and means controlled by car calls for preventing the stopping of the car in its travel in the up direction by said stopping means in response to a down hall call that has remained unanswered for more than a certain length of time when one or more car calls are registered for landings above the landing for which such down hall call is registered.

24. A control system for an elevator car serving a plurality of landings comprising; means for each landing including a hall button for such landing for registering a call for such landing; stopping means for the car; means controlled by said calls for causing operation of said stopping means to stop the car during its travel in a given direction at landings for which calls are registered; means for rending a call which has remained unanswered for more than a certain length of time effective to cause operation of said stopping means to stop the car during its travel in the opposite direction at the landing for which such call is registered, even though a call is registered for a landing beyond; and means operable when two or more calls have remained unanswered for more than a certain length of time and are for landings in effect ahead of the car with the car set for travel in the opposite direction to render that one of said calls for the landing first in effect to be reached by the car effective to cause operation of said stopping means to stop the car at the landing for which such call is registered.

25. A control system for an elevator car serving a plurality of landings comprising; means for each landing including a hall button for such landing for registering a call for such landing; stopping means for the car; means controlled by said calls for causing operation of said stopping means to stop the car during its travel in a given direction at landings for which calls are registered; means for rendering a call which has remained unanswered for more than a certain length of time effective to cause operation of said stopping means to stop the car during its travel in the opposite direction at the landing for which such call is registered, even though a call is registered for a landing beyond; and means operable when two or more calls have remained unanswered for more than a certain length of time and are for landings in effect ahead of the car with the car set for travel in the opposite direction to render that one of such calls for the landing farthest from the car effective to cause operation of said stopping means to stop the car at the landing for which such call is registered before response is had to another of such calls.

26. A control system for an elevator car serving a plurality of landings comprising; means for each landing including a hall button for such landing for registering a call for such landing; stopping means for the car; means controlled by said calls for causing operation of said stopping means to stop the car during its travel in a given direction at landings for which calls are registered; means for rendering a call which has remained unanswered for more than a certain length of time effective to cause operation of said stopping means to stop the car during its travel in the opposite direction at the landing for which such call is registered, even though a call is registered for a landing beyond; and means operable when two or more calls have remained unanswered for more than a certain length of time and are for landings in effect ahead of the car with the car set for travel in the opposite direction to render the first of such calls to be registered effective to cause operation of said stopping means to stop the car at the landing for which such call is registered before response is had to another of such calls.

27. A control system for an elevator car serving a plurality of landings comprising; a down hall button at each landing; down call registering means for each landing responsive to the pressing of the down hall button for such landing for registering a down hall call for such landing; an up hall button at each landing; up call registering means for each landing responsive to the pressing of the up hall button for such landing for registering an up hall call for such landing; a car button for each landing in the car for registering a car call for such landing; stopping means for the car; means responsive to down hall calls that are registered for causing operation of said stopping means to stop the car during its travel in the down direction at the landings for which such down hall calls are registered; means responsive to up hall calls that are registered for causing operation of said stopping means to stop the car during its travel in the up direction at the landings for which such up hall calls are registered; means responsive to car calls that are registered for causing operation of said stopping means to stop the car during its travel in either direction at the landings for which such car calls are registered; means controlled by said down hall calls for rendering any one of them that has remained unanswered for more than a certain length of time effective to cause operation of said stopping means to stop the car during its travel in the up direction at the landing for which such down hall call is registered even though one or more hall calls are registered for landings above; means operable when two or more down hall calls have remained unanswered for more than said certain length of time and are for landings in effect above the car to cause operation of said stopping means to stop the car in response to a certain one of such down hall calls at the landing for which such call is registered; and means controlled by car calls for preventing the stopping of the car in its travel in the up direction by said stopping means in response to a down hall call that has remained unanswered for more than a certain length of time when one or more car calls are registered for landings above the landing for which such down hall call is registered.

28. A control system for an elevator car serving a plurality of landings comprising; means for each landing, including a hall button for such landing for registering a hall call for that landing; means responsive to said hall calls that are registered for stopping the car during its travel in a certain direction at the landings for which such hall calls are registered; and electrical timing apparatus controlled by said hall calls and including a condenser for each landing, a resistance for each condenser and an electronic tube for each condenser and controlled thereby to render the stopping means effective to stop the car during its travel in the opposite direction at such landing, provided the hall call for such landing has remained unanswered for more than a certain length of time.

29. A control system for an elevator car serving a plurality of landings comprising; means for each landing including a hall button for such landing for registering a hall call for that landing; means responsive to said hall calls that are registered for stopping the car during its travel in a certain direction at the landings for which such hall calls are registered; and electrical timing apparatus controlled by said hall calls and including a condenser for each landing, a discharge resistance for each condenser and an electronic tube for each landing having a control grid connected to be subject to the charge on the condenser for that landing for controlling the operation of said stopping means to render it effective to stop the car during travel thereof in the opposite direction at such landing, provided the hall call for such landing has remained unanswered for more than a certain length of time.

30. A control system for a plurality of elevator cars in which means common to the cars is provided at each of a plurality of landings for registering a call for such landing and in which means is provided for each car for stopping the car during its travel in a given direction at landings in response to said calls for such landings, characterized in that means is provided which is responsive to a said call which remains registered for more than a predetermined length of time to stop at the landing for which such call is registered that car of those set for travel in the opposite direction which is first to reach such landing, even though a call which has not been registered for more than said predetermined length of time exists for a landing beyond.

31. A control system for a plurality of elevator cars in which an up hall button common to the cars is provided at each of a plurality of landings for registering an up call for such landing, in which a down hall button common to the cars is provided at each landing for registering a down call for such landing, and in which means is provided for each car for causing stopping of the car during its travel in the down direction at landings in response to down calls for such landings and during its travel in the up direction at landings in response to up calls for such landings, characterized in that means is provided which is rendered effective in response to a down call which remains unanswered for more than a certain period of time to cause the stopping at the landing for which such call is registered of that car of those set for travel in the up direction which is first to reach such landing, but being ineffective to cause the stopping of a car in response to a down call which has remained unanswered for less than said certain period of time.

32. A control system for a plurality of elevator cars in which a down hall button common to the cars is provided at each of a plurality of landings for registering a down call, in which a car button for each landing is provided in each car for registering a call for that car for such landing and in which means is provided for each car for stopping the car during its travel in the down direction at landings in response to calls registered by said down hall buttons and by its car buttons for such landings and during its travel in the up direction at landings in response to calls registered by its car buttons for such landings, characterized in that means is provided which is responsive to a call registered by a down hall button which remains unanswered for more than a predetermined period of time to cause stopping at the landing for which such call is registered of that car of those set for travel in said up direction having no car button pressed for a landing above which is first to reach such landing, even though a call registered by a down hall button which has not remained unanswered for more than said predetermined period of time exists for a landing above.

33. A control system for a plurality of elevator cars in which an up hall button common to the cars is provided at each of a plurality of landings for registering an up call for such landing, in which a down hall button common to the cars is provided at each landing for registering a down call for such landing, in which a car button for each landing is provided in each car for registering a call for that car for such landing and in which means is provided for each car for stopping the car during its travel in the down direction at landings in response to down calls and to calls registered by its car buttons for such landings and during its travel in the up direction at landings in response to up calls and to calls registered by its car buttons for such landings, characterized in that means is provided which is responsive to a down call which remains unanswered for more than a certain period of time to cause stopping at the landing for which such call is registered of that car of those set for travel in the up direction having no car button pressed for a landing above which is first in effect to reach such landing, notwithstanding that a call registered by a hall button which has not remained unanswered for more than said certain period of time exists for a landing above.

34. A control system for a plurality of elevator cars in which a hall button common to the cars is provided at each of a plurality of landings for registering a call for such landing and in which means is provided for each car for causing the stopping of the car during its travel in a given direction at landings in response to said calls for such landings, characterized in that means is provided which is rendered effective in response to a call registered by one of said hall buttons which remains unanswered for more than a certain length of time to cause the stopping of a car at the landing for which such call is registered during travel of the car in the opposite direction, but being ineffective to cause the stopping of a car in response to a call registered by one of said hall buttons which has remained unanswered for less than said certain length of time and that means is provided for causing when there are more than one of such calls which have remained unanswered for more than said certain length of time response to be had to a certain one of them before response is had to another and for causing the car which is stopped in response to said certain call to be the first car travelling in said opposite direction to reach the landing for which said certain call is registered.

35. A control system for a plurality of elevator cars in which a down hall button common to the cars is provided at each of a plurality of landings for registering a down call for such landing and in which means is provided for each car for causing the stopping of the car during its travel in the down direction at landings in response to down calls for such landings, characterized in that means is provided for causing the stopping of a car during its travel in the up direction at a landing only in response to the down call for such landing which has remained unanswered for more than a certain length of time and that means is provided for causing when there are more than one of such down calls which have remained unanswered for more than a certain length of time response to be had to that one of such unanswered calls which was registered first before response is had to another of such unanswered calls and for causing the car which is stopped in response to said first registered call to be the first car travelling in the up direction to reach the landing for which such call is registered.

36. A control system for a plurality of elevator cars in which a down hall button common to the cars is provided at each of a plurality of landings for registering a down call for such landing and in which means is provided for each car for causing the stopping of the car during its travel in the down direction at landings in response to down calls for such landings, characterized in that means is provided for each of a plurality of said landings which is rendered effective in response to a down call for that landing which remains unanswered for more than a certain length of time to cause the stopping of a car at that landing during its travel in the up direction, but being ineffective to cause the stopping of a car in response to a down call for such landing which has remained unanswered for less than said certain length of time and that means is provided for causing when there are more than one of such down calls which have remained unanswered for more than a certain length of time response to be had to the unanswered call for the highest landing of those for which such unanswered calls are registered before response is had to another of such unanswered calls and for causing the car which is stopped in response to said unanswered call for said highest landing to be the first car travelling in the up direction to reach the landing for which such call is registered.

37. A control system for a plurality of elevator cars in which a down hall button common to the cars is provided at each of a plurality of landings for registering a down call for such landing and in which means is provided for each car for causing the stopping of the car during its travel in the down direction at landings in response to down calls for such landings, characterized in that means is provided causing the stopping of a car during its travel in the up direction at a landing only in response to the down call for such landing which has remained unanswered for more than a certain length of time and that means is provided for causing when there are more than one of such down calls which have remained unanswered for more than a certain length of time response to be had to the unanswered call for the first landing of those for which such unanswered calls are registered to be reached by a car before response is had to another of such unanswered calls.

38. A control system for a plurality of elevator cars in which an up hall button common to the cars is provided at each of a plurality of landings for registering an up call for such landing, in which a down hall button common to the cars is provided at each of said landings for registering a down call for such landing, in which each car is provided with a car button for each landing for registering a call for that car for such landing and in which means is provided for each car for causing the stopping of the car during its travel in the down direction in response to down calls and to calls registered by its car buttons at landings for which such calls are registered and during its travel in the up direction in response to up calls and to calls registered by its car buttons at landings for which such calls are registered, characterized in that means is provided which is rendered effective in response to any one of said down calls which remains unanswered for more than a certain length of time to cause the stopping of a car at the landing for which such call is registered during travel of the car in the up direction, but being ineffective to cause the stopping of a car in response to a down call which has remained unanswered for less than said certain length of time and that means is provided for causing the car which is stopped during its travel in said up direction in response to such unanswered call to be the car first in effect to reach the landing for which such unanswered call is registered which has no call registered by a car button for a landing above and for causing when there are more than one of such unanswered calls response to be had to a certain one of such unanswered calls before response is had to another of such unanswered calls.

39. A control system for a plurality of elevator cars serving a plurality of landings comprising; means for each landing including a hall button for such landing for registering a hall call for that landing; means for each car responsive to hall calls which have not been answered for stopping that car during its travel in a certain direction at the landings for which hall calls are registered; and time controlled means for rendering any call which has remained unanswered for more than a certain length of time effective to stop at the landing for which such call is registered that car of those set for travel in the opposite direction which is first to reach such landing.

40. A control system for a plurality of elevator cars serving a plurality of landings comprising; means for each landing including a hall button for such landing for registering a hall call for that landing; means for each car responsive to hall calls which have not been answered for stopping that car during its travel in a certain direction at the landings for which hall calls are registered; time controlled means for rendering any call which has remained unanswered for more than a certain length of time effective to stop at the landing for which such call is registered that car of those set for travel in the opposite direction which is first to reach such landing; and means for each car operable when that car makes a stop in response to a call which has remained unanswered for more than said certain length of time to set the car for travel in said certain direction when the car comes to a stop.

41. In a control system for an elevator car operable past a plurality of floors, provided with a start circuit, a circuit to continue said car motion when started, and a circuit for stopping said car at the floors; the combination, of a down push button at each of said floors, a call storing mechanism responsive to actuation of any one of said push buttons for causing said car stopping circuit to stop said car at said floor any time thereafter when the car approaches said floor on its downward trip, and time delay means also responsive to said actuated down push button for causing said car stopping circuit to stop said car only after a predetermined time after actuation of said down push button when the car approaches said floor on its up trip.

42. In an elevator system for operating a plurality of cars past a floor, a stopping means for each car, a reversing means for each car, a stop call registering device for the floor, means responsive to operation of the call registering device and to the approach of a car in one direction to within stopping distance of the floor for operating its stopping means to stop it at that floor, and means including a time-delay device responsive to the call registering device remaining in unanswered condition for at least a predetermined length of time and to the movement of a car in the opposite direction for operating the stopping means and the reversing means of that car.

GAVIN WATSON.
WILLIAM HENRY BRUNS.
HAROLD EDWARD GALANTY.

REFERENCES CITED

The following references are of record in the file of this patent:

UNITED STATES PATENTS

| Number | Name | Date |
| --- | --- | --- |
| 2,074,575 | Waters et al. | Mar. 23, 1937 |
| 2,103,123 | Stevens | Dec. 21, 1937 |
| 2,148,913 | Stevens | Feb. 28, 1939 |
| 2,291,271 | Williams et al. | July 28, 1942 |